US012681309B2

(12) United States Patent
Martinez et al.

(10) Patent No.: US 12,681,309 B2
(45) Date of Patent: Jul. 14, 2026

(54) PROJECTION DEVICE WITH AN OPTIMIZED EMISSION POINT DISTRIBUTION BASED ON AN ISOLINE CONFIGURATION

(71) Applicants:COMMISSARIAT A L'ENERGIE ATOMIQUE ET AUX ENERGIES ALTERNATIVES, Paris (FR); UNIVERSITE GRENOBLE ALPES, Saint-Martin-D'Heres (FR); INSTITUT POLYTECHNIQUE DE GRENOBLE, Grenoble (FR); Centre national de la recherche scientifique, Paris (FR)

(72) Inventors: Christophe Martinez, Grenoble (FR); Fabian Rainouard, Grenoble (FR); Edouard Oudet, Arvillard (FR)

(73) Assignees: COMMISSARIAT A L'ENERGIE ATOMIQUE ET AUX ENERGIES ALTERNATIVES, Paris (FR); UNIVERSITE GRENOBLE ALPES, Saint Martin d'Heres (FR); INSTITUT POLYTECHNIQUE DE GRENOBLE, Grenoble (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 310 days.

(21) Appl. No.: 18/627,328

(22) Filed: Apr. 4, 2024

(65) Prior Publication Data

US 2024/0337846 A1 Oct. 10, 2024

(30) Foreign Application Priority Data

Apr. 7, 2023 (FR) ...................................... 2303529

(51) Int. Cl.
*G02B 27/01* (2006.01)
*F21V 8/00* (2006.01)

(52) U.S. Cl.
CPC ....... *G02B 27/0172* (2013.01); *G02B 6/0026* (2013.01); *G02B 6/0065* (2013.01);
(Continued)

(58) Field of Classification Search
CPC ............ G02B 27/0172; G02B 27/0103; G02B 27/4205; G02B 6/0026; G02B 6/0065;
(Continued)

(56) References Cited

U.S. PATENT DOCUMENTS 8,593,734 B2 * 11/2013 Laakkonen ........ G02B 27/0081
359/13
12,181,702 B2 * 12/2024 Martinez .............. G02B 6/0035
(Continued)

FOREIGN PATENT DOCUMENTS

FR 3 022 642 A1 12/2015
FR 3 122 929 A1 11/2022

OTHER PUBLICATIONS

Rainouard, et al., "Optimal dense and random addressing design of emissive points in a retinal projection device", Proceedings of the SPIE, vol. 12138, 2022.
(Continued)

*Primary Examiner* — William R Alexander
(74) *Attorney, Agent, or Firm* — BakerHostetler

(57) ABSTRACT
A method for manufacturing an image projection device for projecting an image onto an eye, includes an emission surface S. The surface S comprises a set of waveguides, a set of diffraction gratings and a set of electrodes. Each grating is positioned at the intersection of one of the guides and one of the electrodes so as to form an emission point for a light wave, the set of waveguides being arranged in a waveguide
(Continued)

configuration, and the set of electrodes being arranged in an electrode configuration. The method comprises a phase of designing the device and a phase of physically manufacturing the device thus designed. The design phase comprises the step consisting in determining the waveguide configuration or the electrode configuration, the determined configuration being a non-rectilinear isoline configuration defined in the plane defined by the emission surface S and generating an aperiodic distribution of the emission points.

13 Claims, 19 Drawing Sheets

(52) U.S. Cl.
CPC .. *G02B 27/0103* (2013.01); *G02B 2027/0105* (2013.01); *G02B 2027/0109* (2013.01); *G02B 2027/0174* (2013.01)

(58) Field of Classification Search
CPC .... G02B 2027/0105; G02B 2027/0109; G02B 2027/0174; G02B 2027/0147; G02B 5/1819

USPC ........................................................ 359/13
See application file for complete search history.

(56) References Cited

U.S. PATENT DOCUMENTS

| | | | |
|---|---|---|---|
| 12,529,936 B1 * | 1/2026 | Blanche ................ | G02F 1/2955 |
| 2015/0370073 A1 * | 12/2015 | Martinez .............. | G02B 6/0036 |
| | | | 359/630 |
| 2021/0231861 A1 * | 7/2021 | Martinez .............. | G02B 6/0035 |
| 2024/0337847 A1 * | 10/2024 | Martinez .............. | G02B 6/0026 |

OTHER PUBLICATIONS

Rainouard, et al., "Improved mathematical model for a dense network of waveguide and electrode design", Proceedings of the SPIE, vol. 11689, 2021.
Sethian, "Level Set Methods and Fast Marching Methods Evolving Interfaces in Computational Geometry, Fluid Mechanics Computer Vision and Materials Science", Cambridge University Press, 1999.

* cited by examiner

FIG. 11a

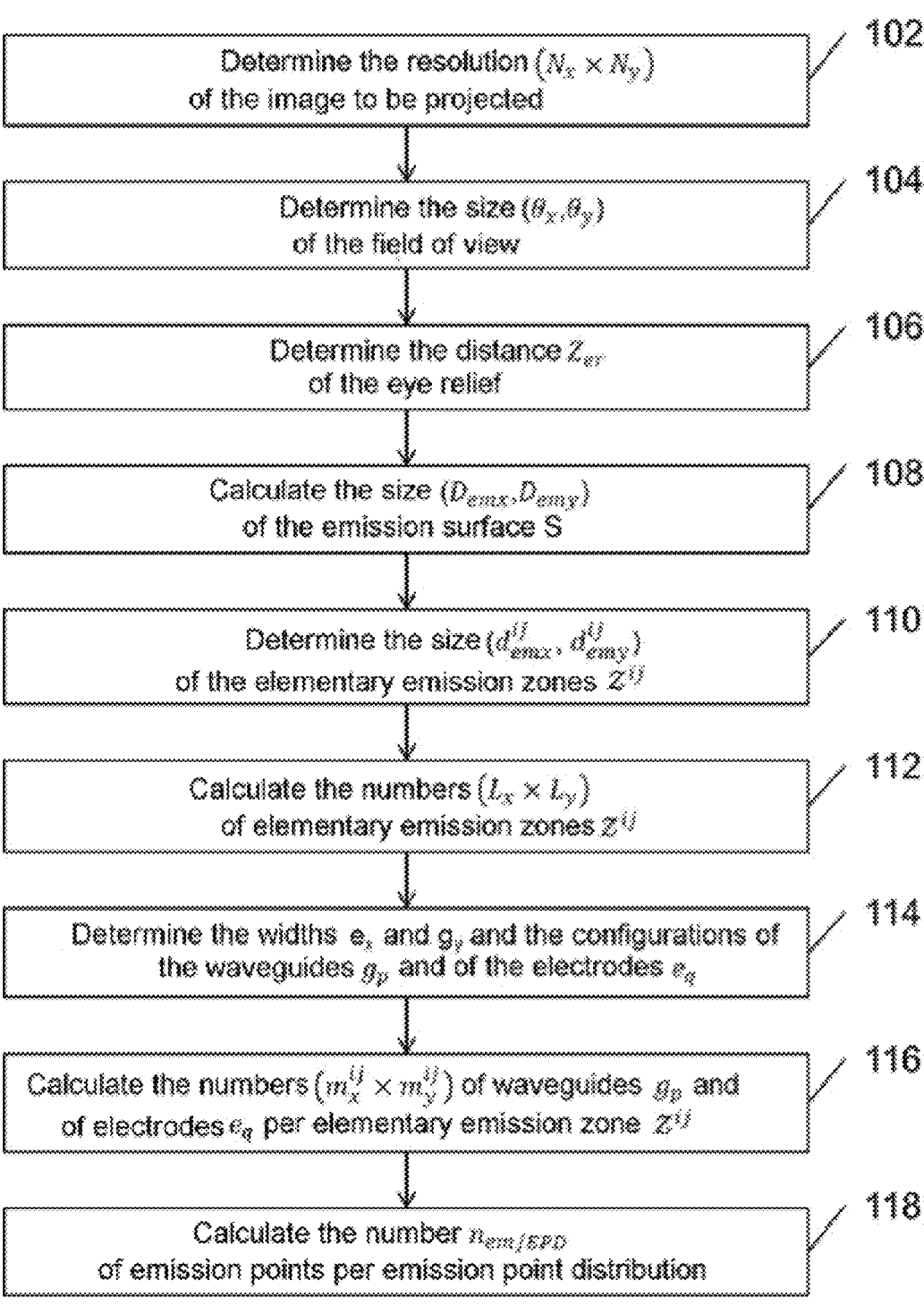

Determine the resolution $(N_x \times N_y)$
of the image to be projected
/ 102

Determine the size $(\theta_x, \theta_y)$
of the field of view
/ 104

Determine the distance $Z_{er}$
of the eye relief
/ 106

Calculate the size $(D_{emx}, D_{emy})$
of the emission surface S
/ 108

Determine the size $(d_{emx}^{ij}, d_{emy}^{ij})$
of the elementary emission zones $Z^{ij}$
/ 110

Calculate the numbers $(L_x \times L_y)$
of elementary emission zones $Z^{ij}$
/ 112

Determine the widths $e_x$ and $g_y$ and the configurations of
the waveguides $g_p$ and of the electrodes $e_q$
/ 114

Calculate the numbers $(m_x^{ij} \times m_y^{ij})$ of waveguides $g_p$ and
of electrodes $e_q$ per elementary emission zone $Z^{ij}$
/ 116

Calculate the number $n_{em/EPD}$
of emission points per emission point distribution
/ 118

FIG. 11b

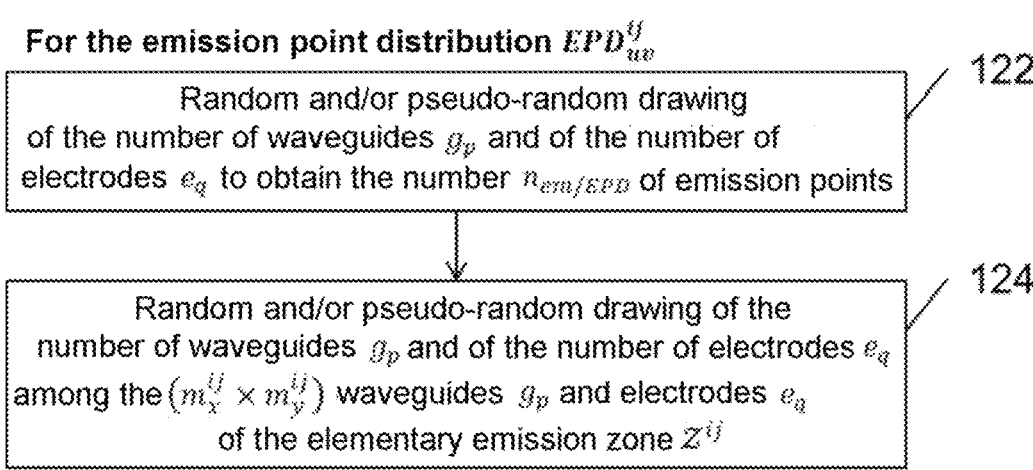

For the emission point distribution $EPD_{uv}^{ij}$

Random and/or pseudo-random drawing
of the number of waveguides $g_p$ and of the number of
electrodes $e_q$ to obtain the number $n_{em/EPD}$ of emission points    122

Random and/or pseudo-random drawing of the
number of waveguides $g_p$ and of the number of electrodes $e_q$
among the $\left(m_x^{ij} \times m_y^{ij}\right)$ waveguides $g_p$ and electrodes $e_q$
of the elementary emission zone $Z^{ij}$    124

FIG. 14

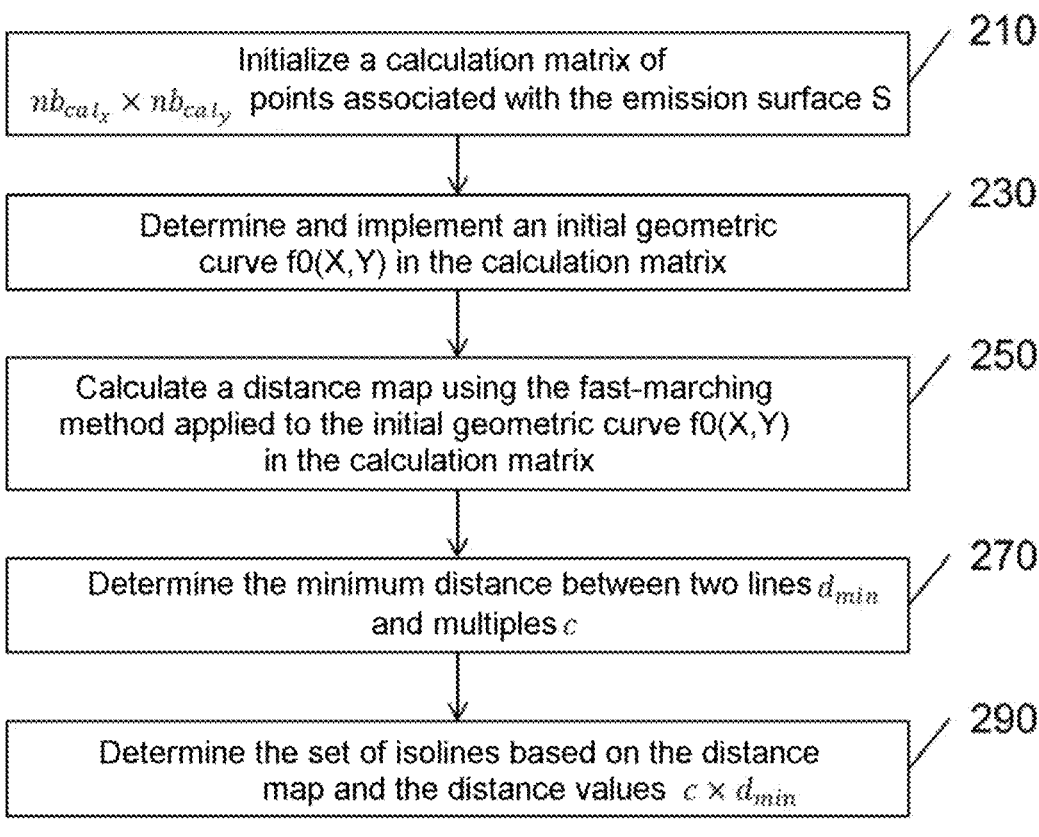

Initialize a calculation matrix of $nb_{cal_x} \times nb_{cal_y}$ points associated with the emission surface S — 210

Determine and implement an initial geometric curve f0(X,Y) in the calculation matrix — 230

Calculate a distance map using the fast-marching method applied to the initial geometric curve f0(X,Y) in the calculation matrix — 250

Determine the minimum distance between two lines $d_{min}$ and multiples $c$ — 270

Determine the set of isolines based on the distance map and the distance values $c \times d_{min}$ — 290

Segment translation                              Isolines

Segment translation

PROJECTION DEVICE WITH AN OPTIMIZED EMISSION POINT DISTRIBUTION BASED ON AN ISOLINE CONFIGURATION

CROSS-REFERENCE TO RELATED APPLICATION

This application claims priority to foreign French patent application No. FR 2303529, filed on Apr. 7, 2023, the disclosure of which is incorporated by reference in its entirety.

FIELD OF THE INVENTION

The present invention relates in general to the projection of an image onto an eye, in augmented reality applications, and in particular to a projection device with an optimized emission point distribution on a discretized emission surface and based on an isoline configuration, and to a method for manufacturing such a device.

BACKGROUND

A portable optical augmented reality data display system superimposes, on the real-world view of a user of the system, an image containing information intended for the user, such as for example information about their environment, their position, their speed of movement, etc.

Some known portable optical augmented reality data display systems use an image projection device comprising a transparent integrated optical circuit composed of an array of nanometric light guides, an electrode array and a holographic film, as described for example in patent applications FR3122929A1 and FR3022642A1. Such an image projection device is implemented without a screen or an optical system, thereby making it possible to obtain a compact optical system and a wide field of view for the user. The intersections of the nanometric light guide circuit with the electrode array make it possible to define a set of emission points able to emit a light wave directed towards the pupil of the eye of the user. The set of emission points is subdivided into various subsets, each subset comprising emission points that are distributed as randomly as possible. The light waves associated with one and the same subset of emission points propagate in one and the same direction so as to form a single light spot at the retina of the eye of the user. A light spot corresponds to a pixel of an image to be projected.

However, such a device has the drawback of using emission point distributions that are defined according to certain spatial periodicities that generate diffraction effects when the image is formed on the retina. Moreover, it also has a limited density of the emission points of each subset subdivided so as to form each light spot. This results in a luminous halo associated with retinal projection, which degrades the contrast of the image to be displayed. As a result, the quality of the projection of images onto the retina of a user is insufficient.

There is thus a need for an improved image projection device that makes it possible to increase the density of emission points of a subdivided subset while at the same time improving the pseudo-random and aperiodic distribution of the emission points.

SUMMARY OF THE INVENTION

The present invention aims to improve the situation by proposing a method for manufacturing an image projection device for projecting an image onto an eye. The device is defined in an orthogonal reference system (X,Y,Z) and comprises an emission surface S extending generally in the plane (X,Y) of the orthogonal reference system (X,Y,Z). The emission surface S comprises a stack of elements, the elements comprising a set of $M_x$ waveguides $g_p$, a set of $M_x \times M_y$ diffraction gratings $r_{pq}$ and a set of $M_y$ electrodes $e_q$, $M_x$ and $M_y$ being positive integers whose product $M_x \times M_y$ is strictly greater than 1. Each diffraction grating $r_{qp}$ is positioned at the intersection of one of the waveguides $g_p$ and of one of the electrodes $e_p$ so as to form an emission point $EP_{pq}$ for a light wave. The set of $M_x$ waveguides $g_p$ is arranged in a waveguide configuration, and the set of $M_y$ electrodes $e_q$ is arranged in an electrode configuration.

The method comprises a phase of designing the device and a phase of physically manufacturing the device thus designed. The design phase comprises a step consisting in determining the waveguide configuration or the electrode configuration, the determined configuration being a non-rectilinear isoline configuration defined in the plane (X,Y) defined by the emission surface S and generating an aperiodic distribution of the $M_x \times M_y$ emission points $EP_{pq}$.

In some embodiments, the step of determining a configuration may consist in determining the waveguide configuration and the electrode configuration, the determined configurations being a configuration of non-rectilinear isolines defined in the plane (X,Y) defined by the emission surface S and generating an aperiodic distribution of the $M_x \times M_y$ emission points $EP_{pq}$.

Advantageously, the design phase may comprise the step consisting in determining an initial geometric curve extending on either side of the emission surface S along an axis of extension parallel to the axis X and/or to the axis Y of the orthogonal reference system (X,Y,Z). The initial geometric curve may be defined randomly while complying with at least one curve construction characteristic.

The initial geometric curve may consist of a succession of segments.

According to some embodiments, the design phase may comprise the step consisting in applying a distance function to the initial geometric curve so as to generate the isoline waveguide configuration and/or the isoline electrode configuration.

The distance function may be determined using a fast-marching method.

Advantageously, the initial geometric curve may comprise only ordinary points referred to as 'regular points' for which the partial derivatives of the curve along X and Y are not simultaneously zero.

The initial geometric curve may comprise, at any point of the curve, in the plane (X,Y), a radius of curvature greater than or equal to a predefined minimum radius of curvature.

The minimum radius of curvature may be defined as a function of the physical properties of the waveguides $g_p$ and/or of the electrodes $e_q$, and/or of the manufacturing constraints of the waveguides or of the electrodes.

In some embodiments, the design phase may comprise the step consisting in discretizing the emission surface S into $L_x \times L_y$ elementary emission zones $Z^{ij}$ in a continuous mesh in the plane (X,Y), each elementary emission zone $Z^{ij}$ comprising a subset of $$m_x^{ij} \times m_y^{ij}$$

emission points $$EP_{pq}^{ij}.$$

3

The step consisting in determining the waveguide configuration and/or the electrode configuration may be applied to each elementary emission zone $Z^{ij}$ so as to form a non-rectilinear isoline waveguide sub-configuration and/or a non-rectilinear isoline electrode sub-configuration.

The non-rectilinear isoline waveguide sub-configuration and/or the non-rectilinear isoline electrode sub-configuration may be generated by applying a fast-marching method to an initial geometric curve extending in the plane of the emission surface S on either side of the elementary emission zone $Z^{ij}$ along an axis of extension parallel to the axis X and/or to the axis Y.

Another subject of the invention is an image projection device for projecting an image onto an eye. The device is manufactured based on the manufacturing method. The device is defined in an orthogonal reference system (X,Y,Z) and comprises an emission surface S extending generally in the plane (X,Y) of the orthogonal reference system (X,Y,Z). The emission surface S comprises a stack of elements, the elements comprising a set of $M_x$ waveguides $g_p$, a set of $M_x \times M_y$ diffraction gratings $r_{pq}$ and a set of $M_y$ electrodes $e_q$, the numbers $M_x$ and $M_y$ being integers strictly greater than 1. Each diffraction grating $r_{qp}$ is positioned at the intersection of one of the waveguides $g_p$ and one of the electrodes $e_p$ so as to form an emission point $EP_{pq}$ for a light wave. The set of $M_x$ waveguides $g_p$ is arranged in a waveguide configuration, and the set of $M_y$ electrodes $e_q$ is arranged in an electrode configuration. The waveguide configuration or the electrode configuration are non-rectilinear isoline configurations defined in the plane (X,Y) defined by the emission surface S and generating an aperiodic distribution of the $(M_x \times M_y)$ emission points $EP_{pq}$.

The invention also provides a transparent portable optical data display system comprising an image projection device. The system is a glasses system or an augmented reality headset.

The image projection device according to the embodiments of the invention makes it possible to improve the quality, in particular the contrast, of the projection of images onto the retina of a user, based on an optimized aperiodic emission point distribution on a discretized emission surface, an increase in the densification of emission points on an emission surface and isoline configurations.

Such a device also makes it possible to facilitate and speed up the method for manufacturing the device.

BRIEF DESCRIPTION OF THE DRAWINGS

Other features, details and advantages of the invention will become apparent on reading the description provided with reference to the appended drawings, which are given by way of example.

4

Figure 4:
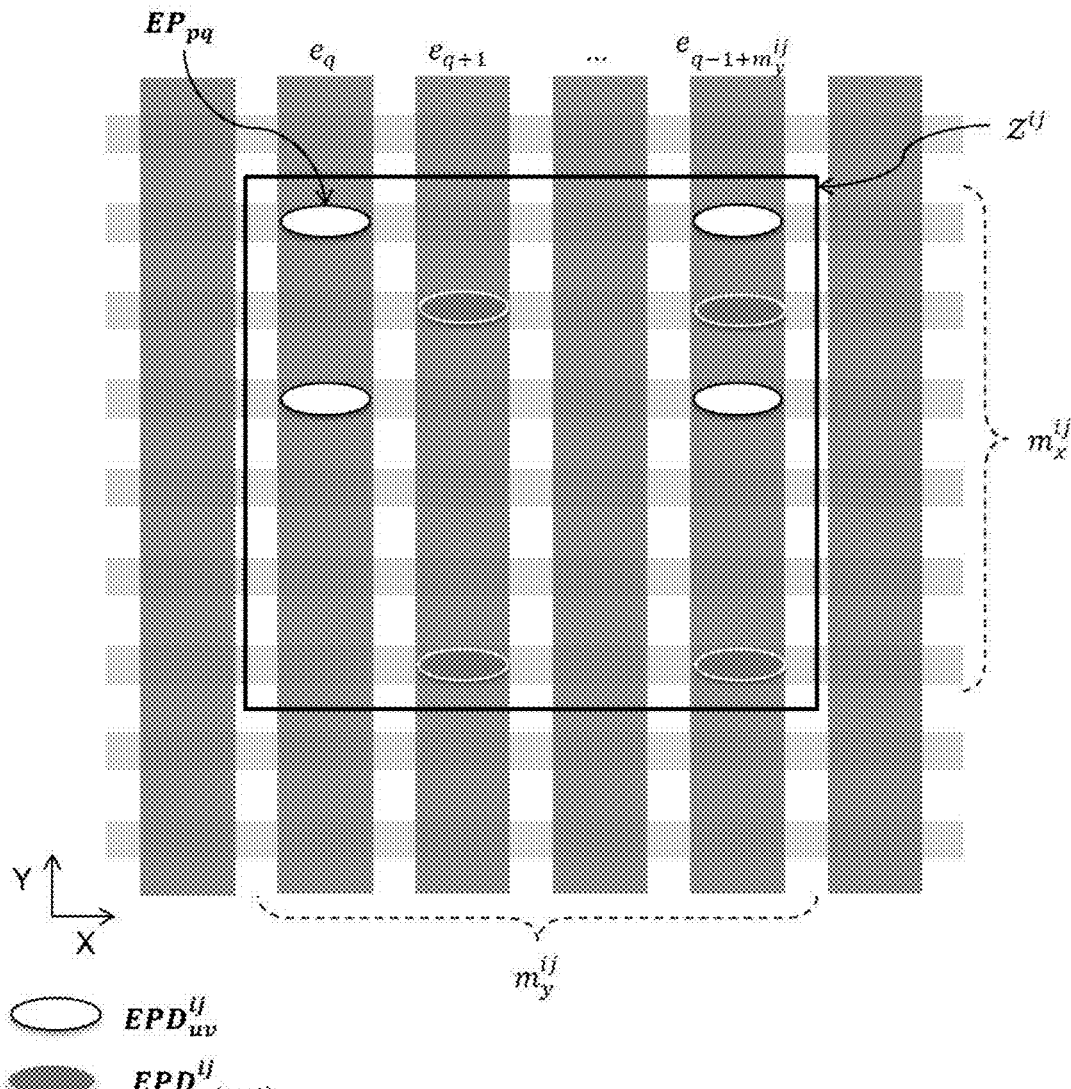

FIG. 4 is a diagram showing an elementary emission zone of the discretized emission surface of an image projection device in the plane (X,Y), according to some embodiments of the invention.

Figure 5:
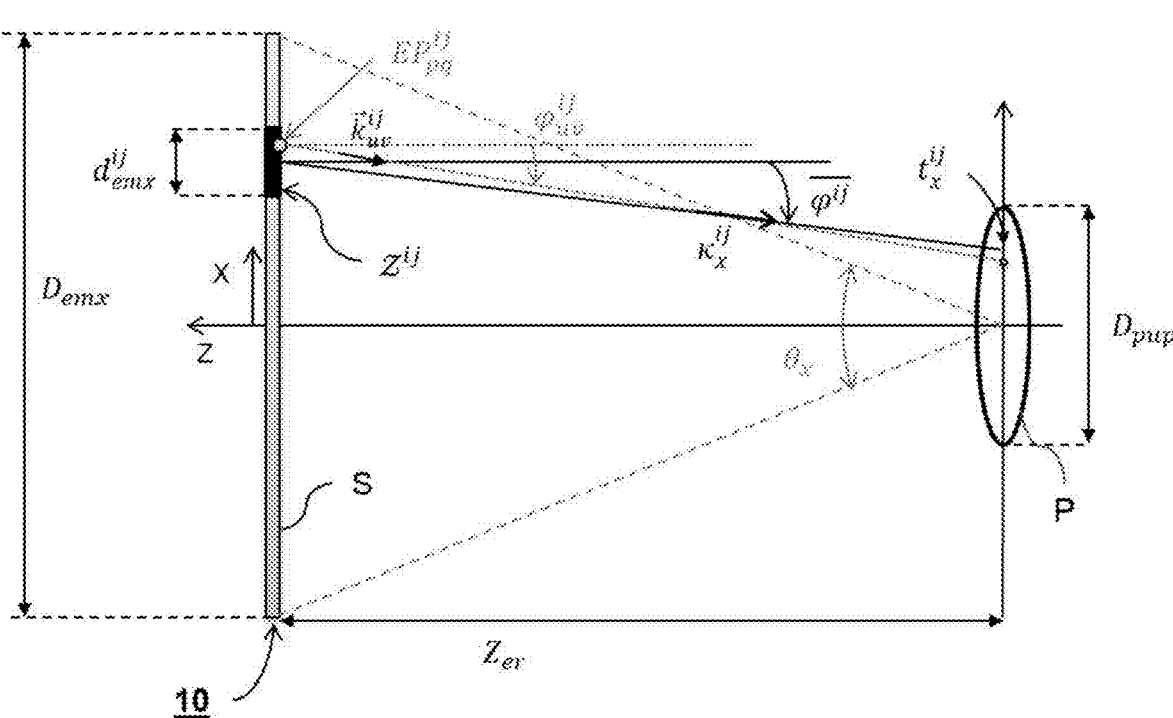

FIG. 5 is a diagram showing a projection in the plane (X,Y) of the angular projection domain associated with an elementary emission zone of the discretized emission surface of an image projection device, according to some embodiments of the invention.

Figure 6:
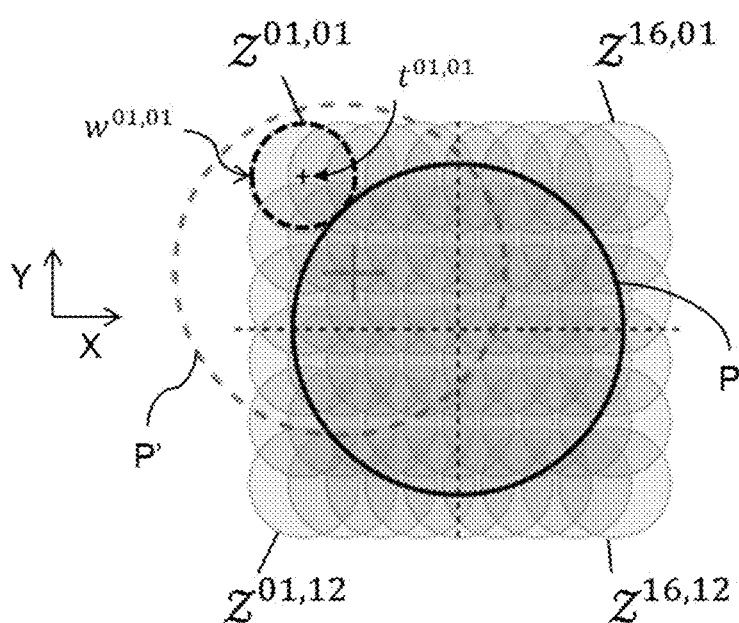

FIG. 6 is a diagram showing a set of illumination zones on a pupil associated with the elementary emission zones of the discretized emission surface of an image projection device, according to some embodiments of the invention.

Figure 7A:
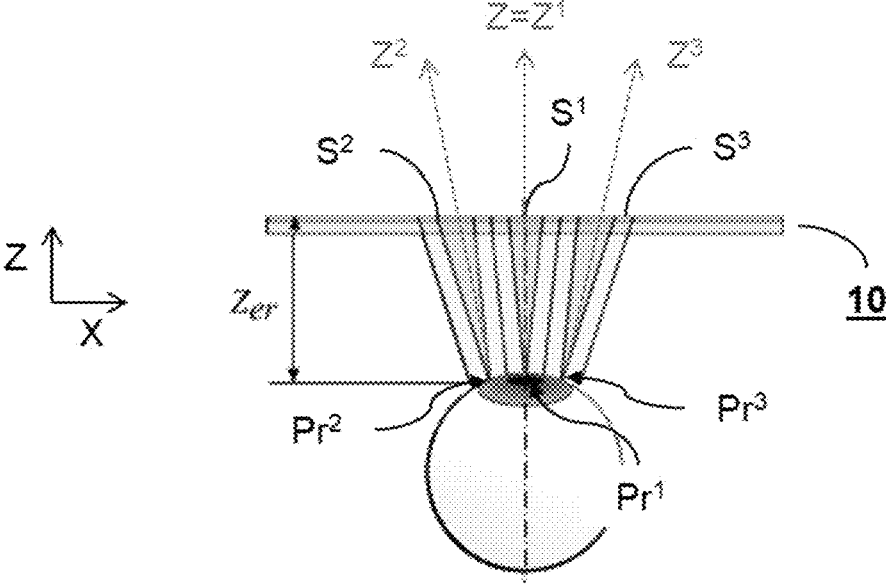
Figure 7B:
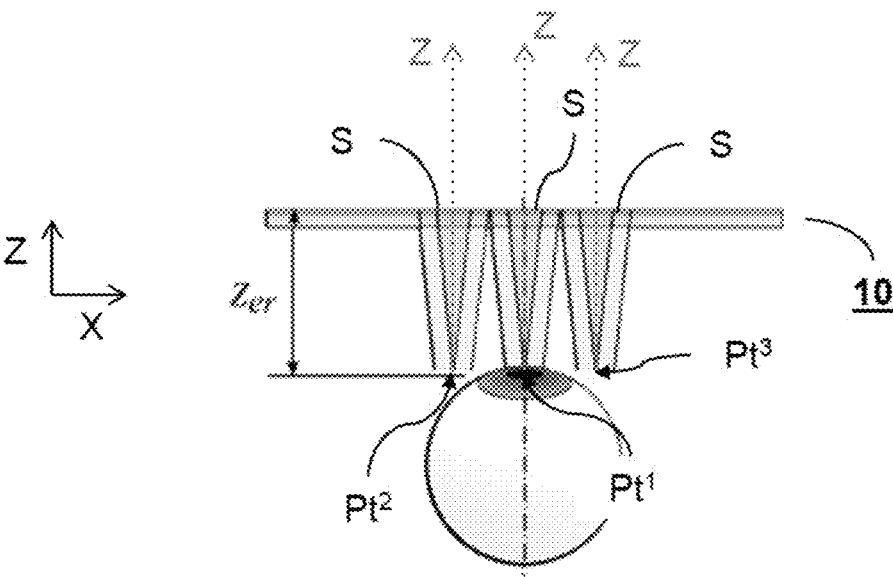

FIG. 7a and FIG. 7b are diagrams showing emission surfaces reproduced in the plane (X,Y) on an image projection device, according to some embodiments of the invention.

Figure 8A:
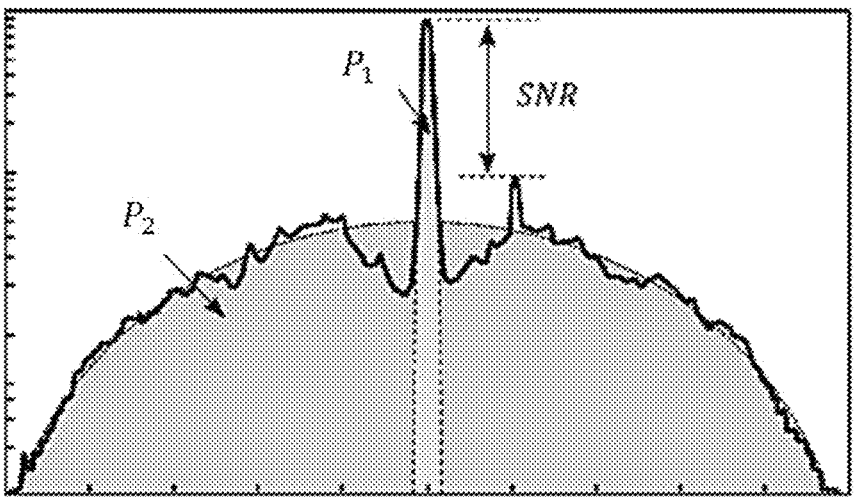

FIG. 8a is a graph showing a spatial distribution of the intensity of the percussive response formed by an emission point distribution of an image projection device, according to some embodiments of the invention.

Figure 8B:
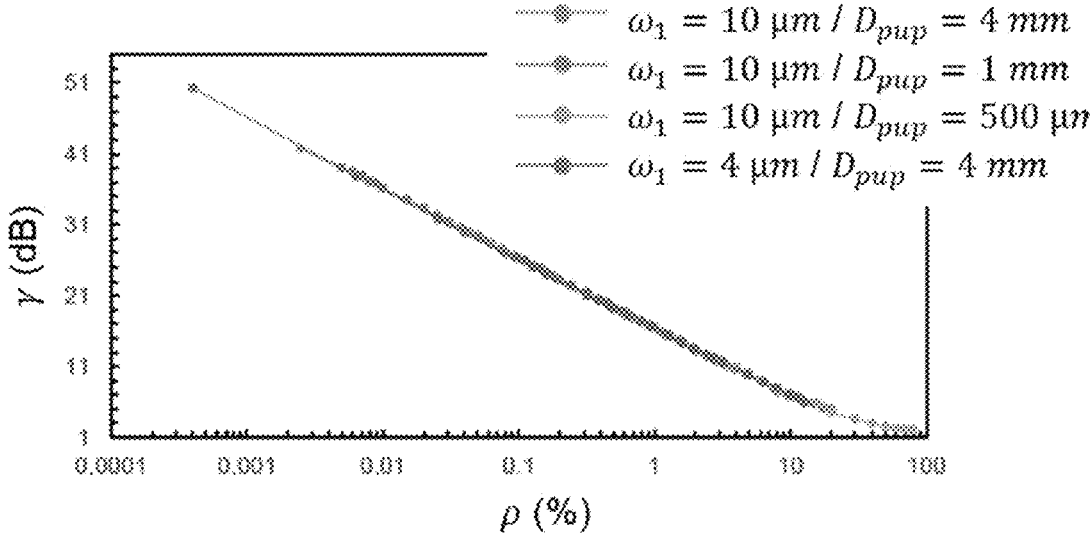

FIG. 8b is a graph showing an evolution of a ratio of power of a spatial distribution of the intensity of the percussive response as a function of a density of the emission points of an image projection device, according to some embodiments of the invention.

Figure 9:
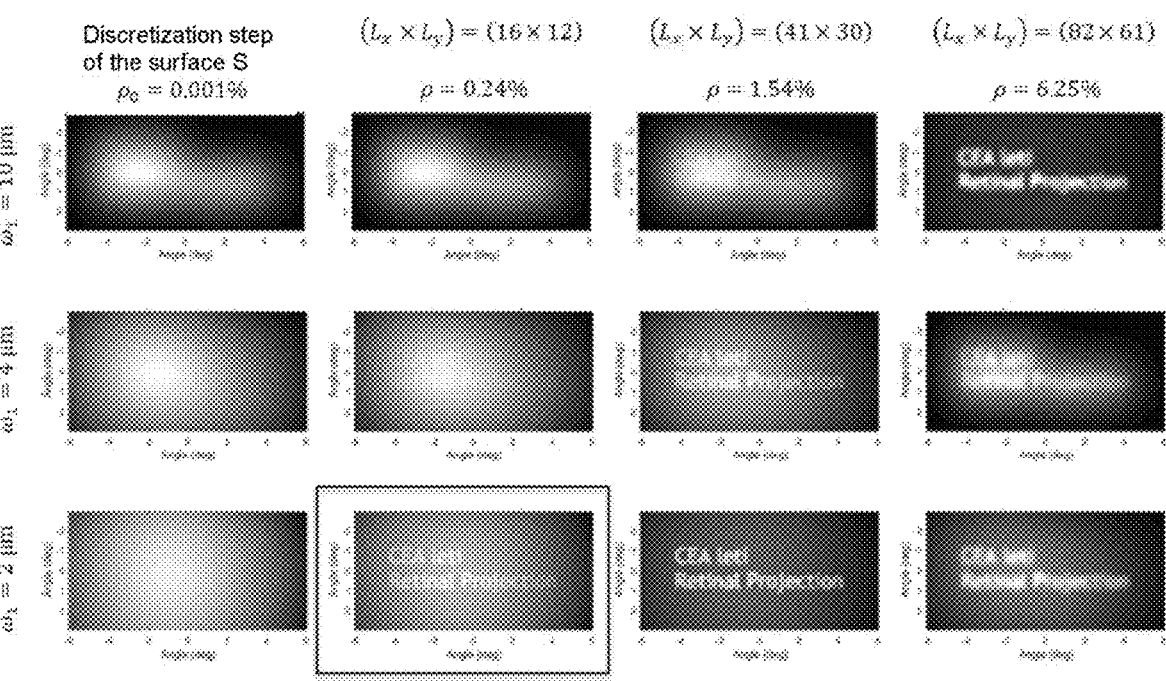

FIG. 9 illustrates the results of simulations of a projected image for various comparative dimensions of an image projection device, according to some embodiments of the invention.

Figure 10:
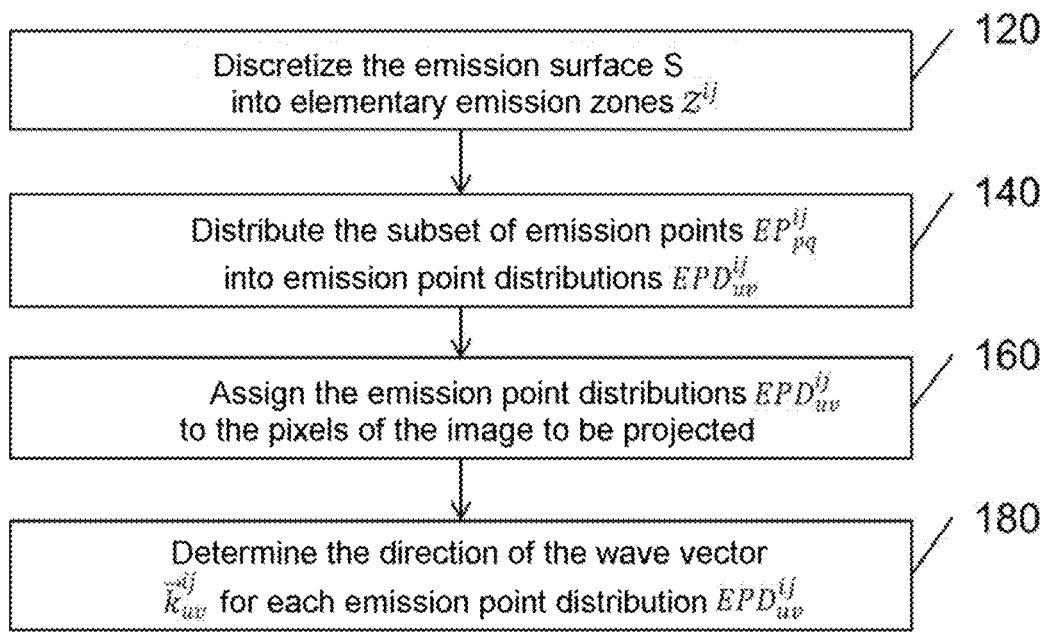

FIG. 10 is a flowchart showing steps of a method for manufacturing the image projection device, according to some embodiments of the invention.

FIG. 11a and FIG. 11b are flowcharts showing sub-steps of a method for manufacturing the image projection device, according to some embodiments of the invention.

Figures 12A, 12B:
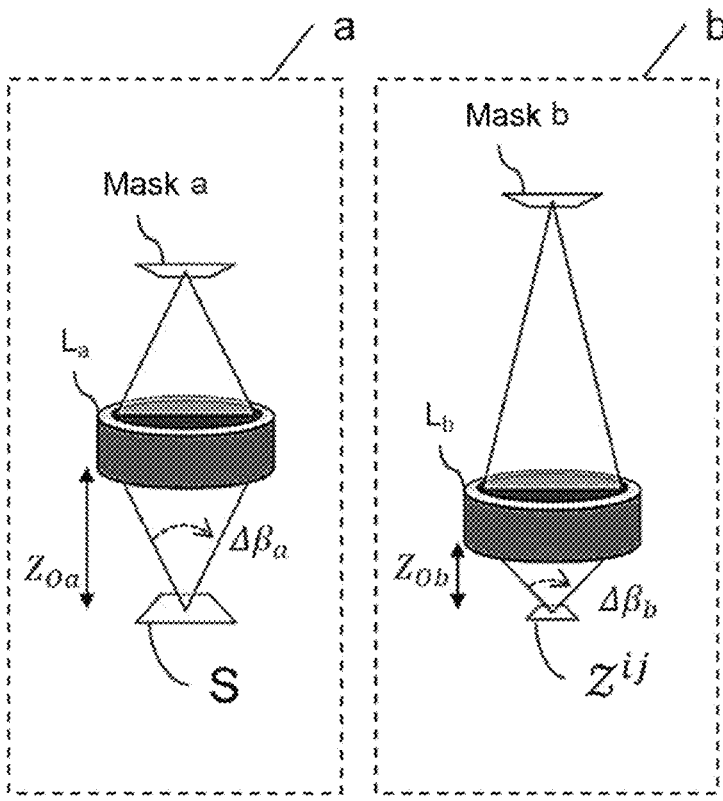

FIG. 12a and FIG. 12b are diagrams showing an optical hologram recording system, according to some embodiments of the invention.

Figure 13:
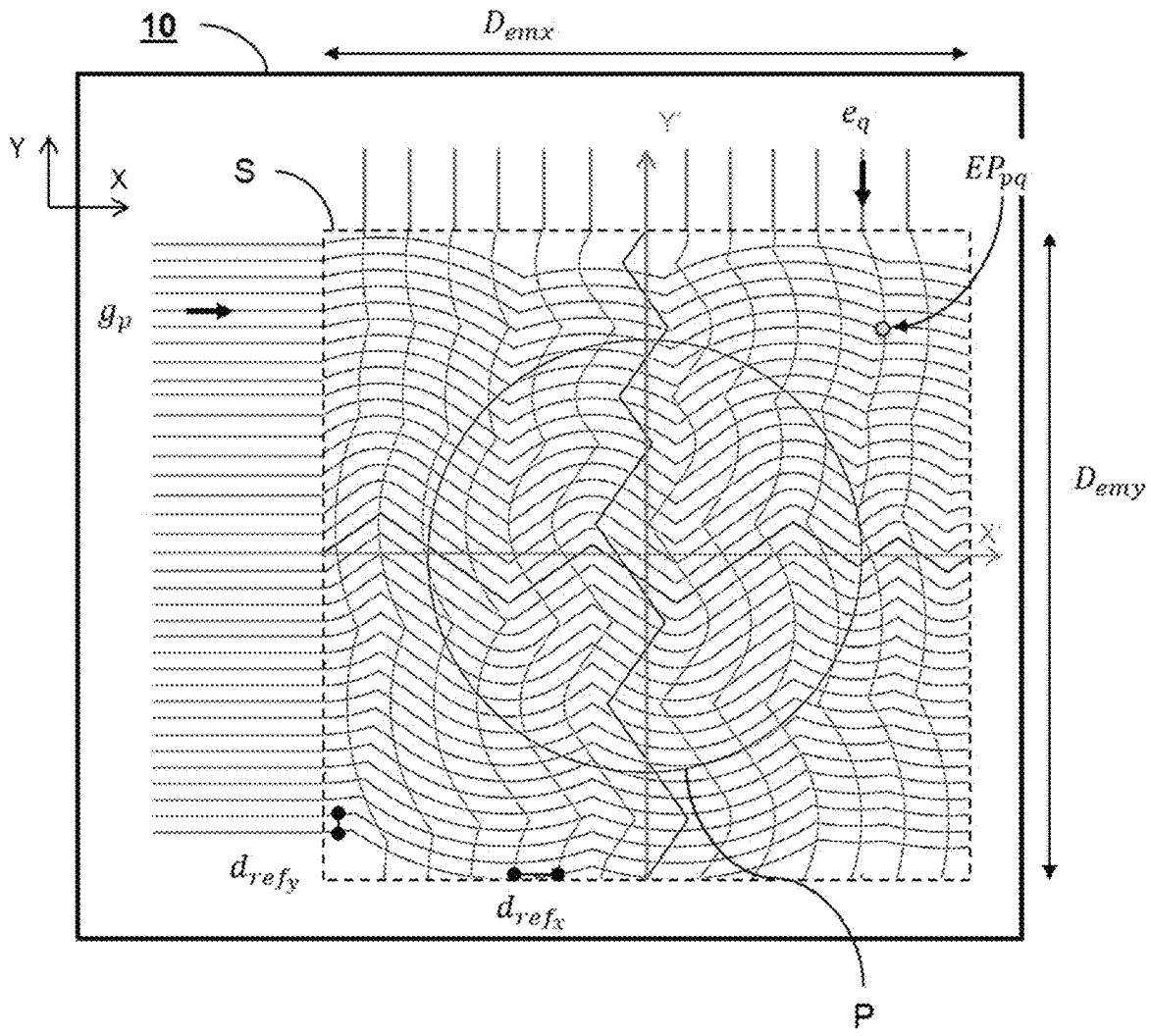

FIG. 13 is a diagram showing the isoline waveguide and electrode configurations of an emission surface of an image projection device, according to some embodiments of the invention.

FIG. 14 is a flowchart showing steps of a method for manufacturing the image projection device, according to some embodiments of the invention.

Figure 15:
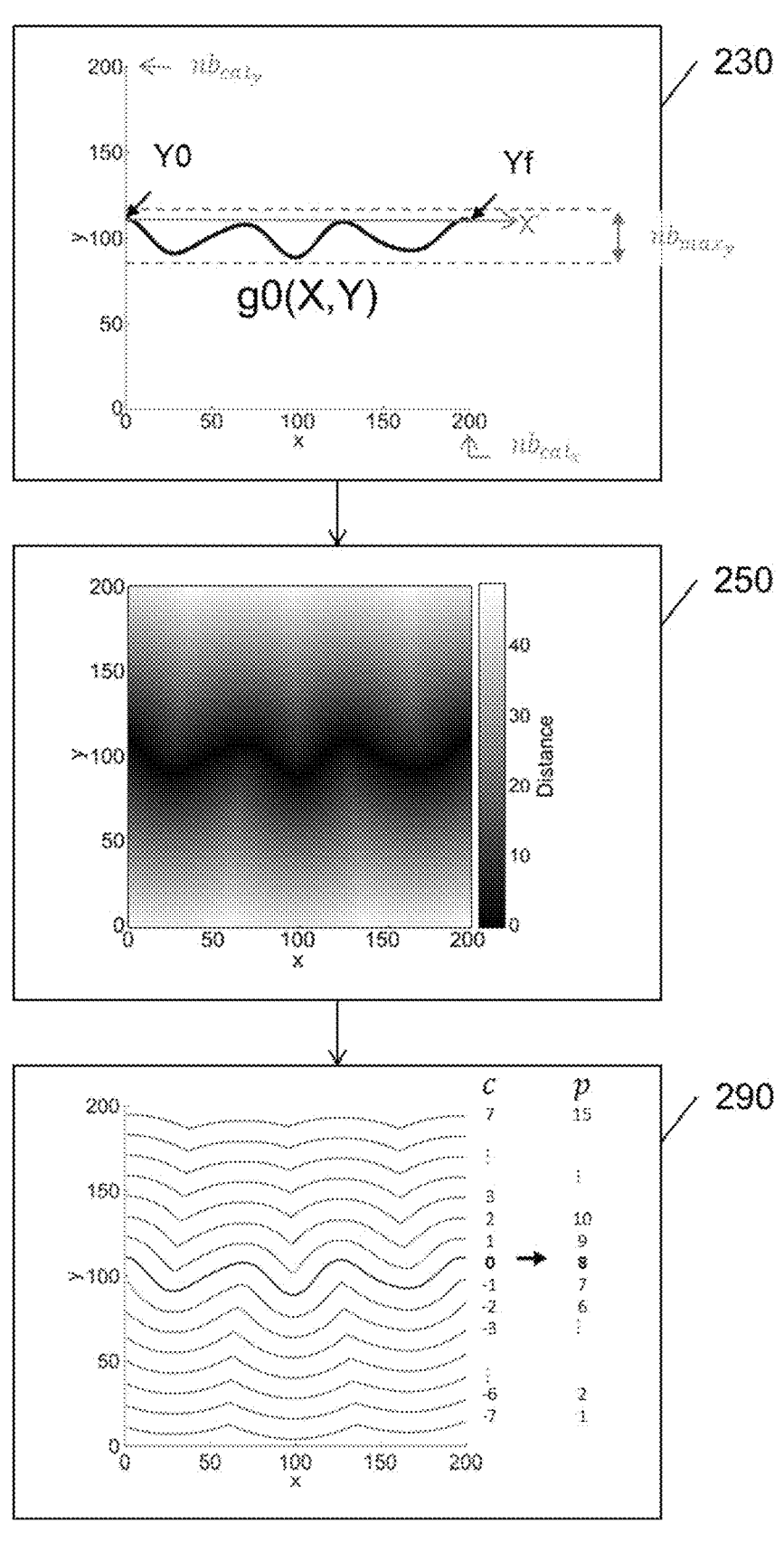

FIG. 15 is a flowchart showing graphs associated with steps of a method for manufacturing the image projection device, according to some embodiments of the invention.

Figure 16A:
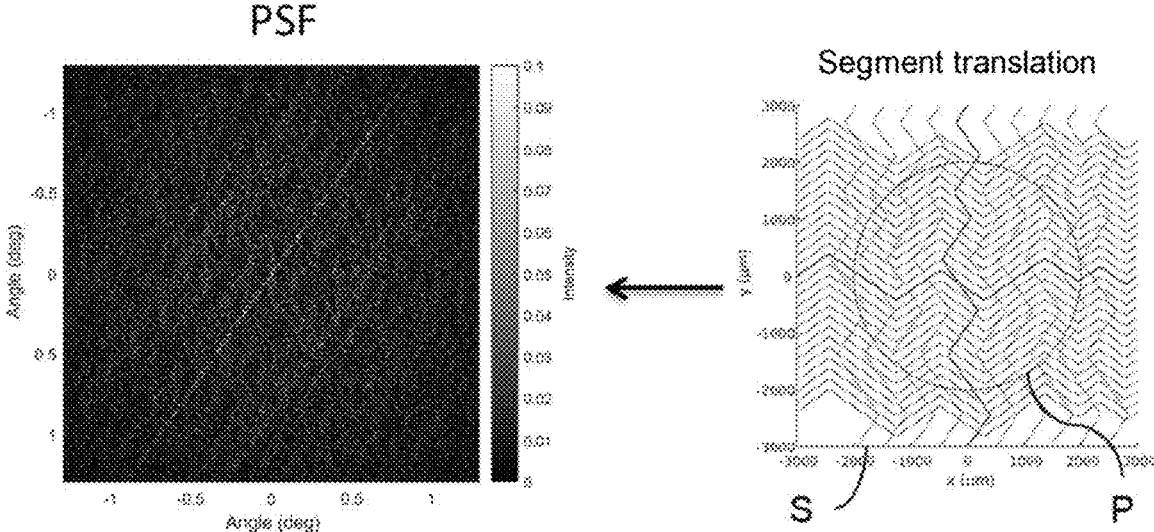
Figure 16B:
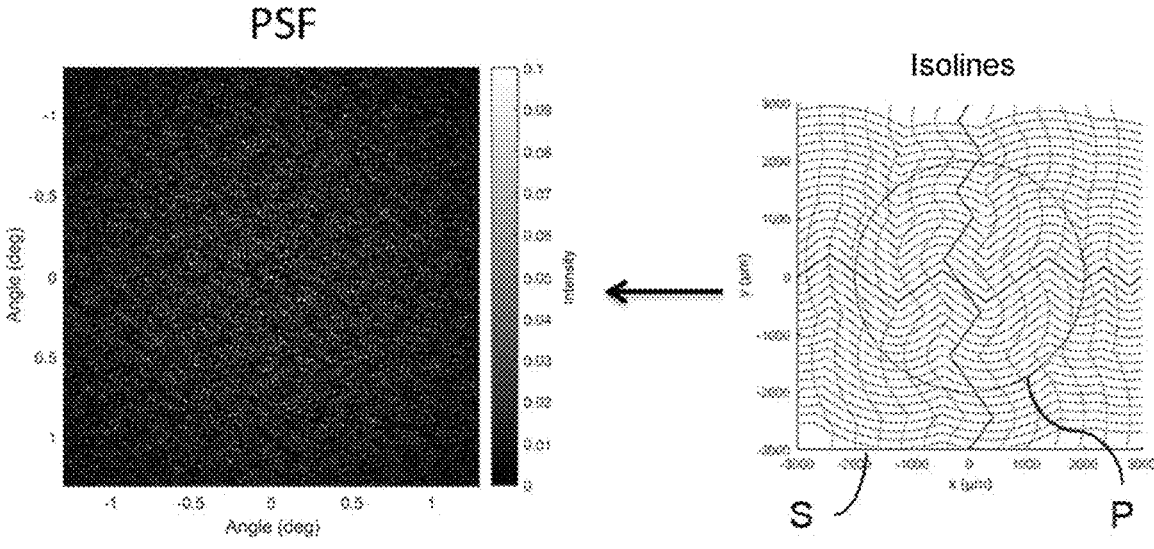

FIG. 16a and FIG. 16b show results of simulating the spatial distribution of the intensity of the percussive response for configurations based on "segment translations" and isoline configurations of an emission surface of an image projection device, according to some embodiments of the invention.

Figure 17A:
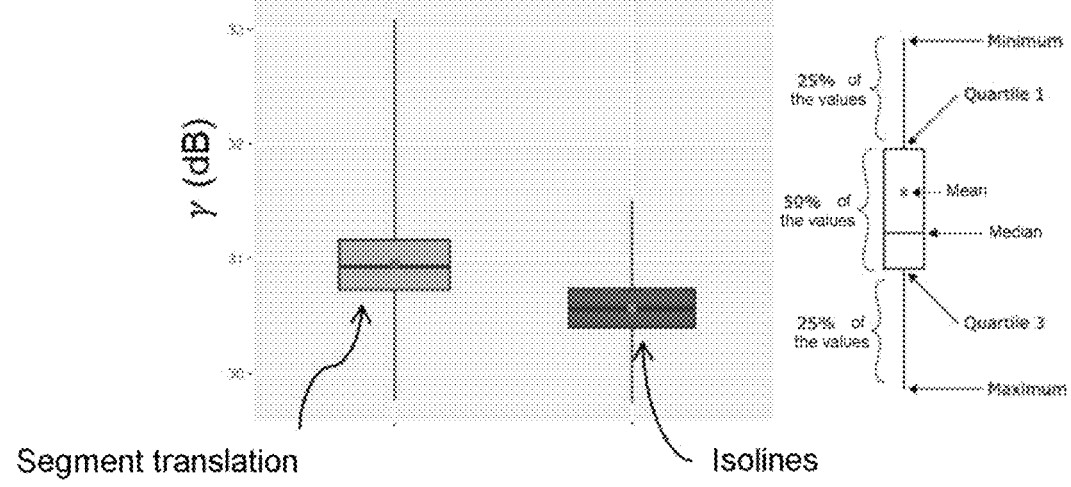
Figure 17B:
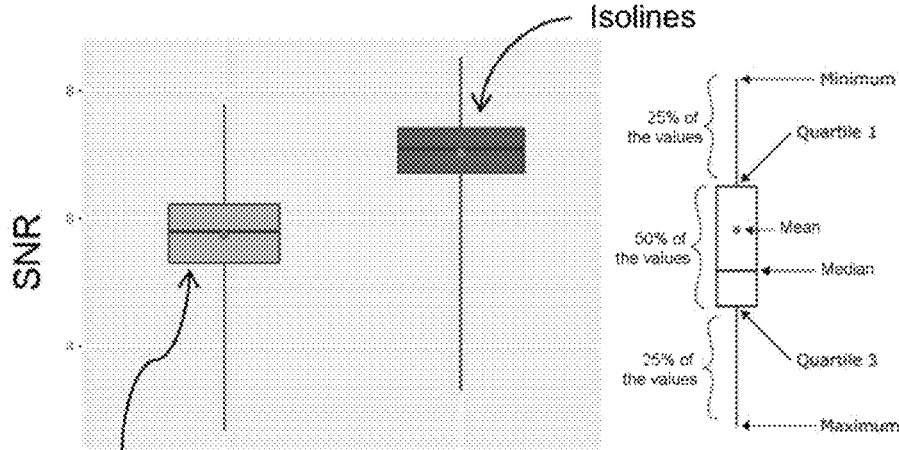

FIG. 17a and FIG. 17b show results of applying criteria for quantifying the quality of the projection of an image for configurations based on "segment translations" and isoline configurations of an emission surface of an image projection device, according to some embodiments of the invention.

Figure 18:
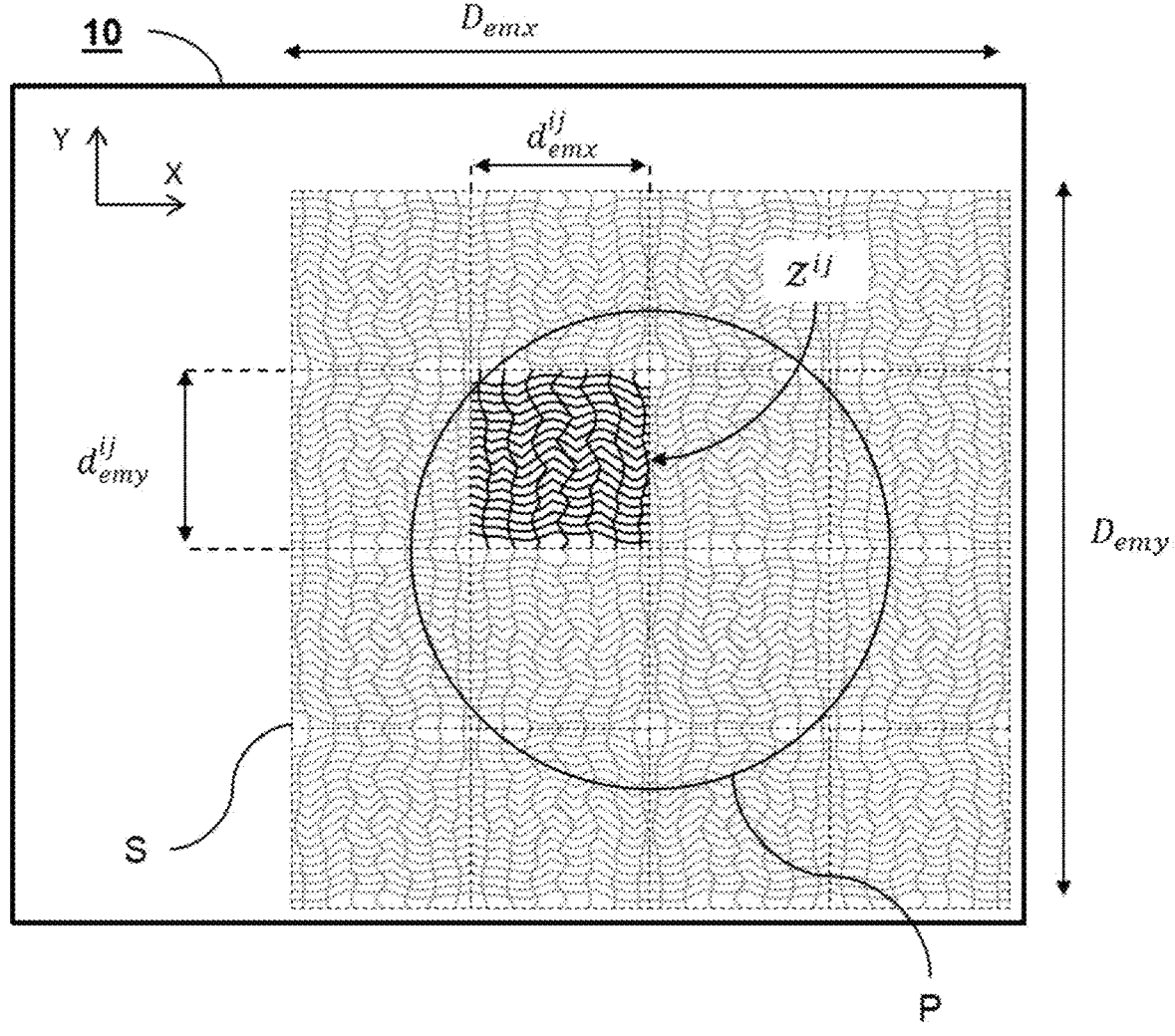

FIG. 18 is a diagram showing the isoline waveguide and electrode configurations associated with a discretization of the emission surface of an image projection device in the plane (X,Y), according to some embodiments of the invention.

Identical references are used in the figures to denote identical or similar elements. For the sake of clarity, the elements that are shown are not to scale. Moreover, in the remainder of the description, unless indicated otherwise, the terms "substantially" and "generally" mean "to within plus or minus 10%".

DETAILED DESCRIPTION

Figure 1A:
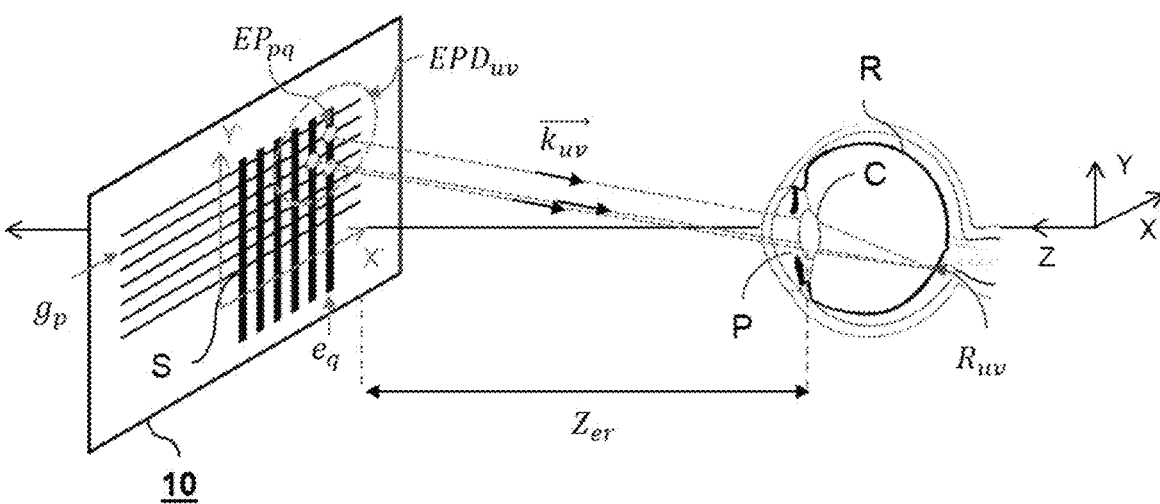
FIG. 1a is a diagram showing an image projection device, according to some embodiments of the invention.

FIG. 1a schematically shows an image projection device 10 defined in an orthogonal reference system (X,Y,Z) and comprising a set of waveguides $g_p$ comprising a number $M_x$ of waveguides and a set of electrodes $e_q$ comprising $M_y$ electrodes, each waveguide $g_p$ being non-parallel to each of the electrodes $e_q$, according to some embodiments of the invention.

The numbers $M_x$ and $M_y$ are positive integers whose product $(M_x \times M_y)$ is strictly greater than 1. The parameter p denotes an index associated with the various waveguides $g_p$, with $p \in [1, M_x]$, and the parameter q denotes an index associated with the various electrodes $e_q$, with $q \in [1, M_y]$.

The image projection device 10 may be used for example in a portable optical data display system, in the field of augmented reality (AR) image display, and more generally in the field of virtual reality (VR) and mixed reality (MR). FIG. 1a corresponds to such an application. As shown in FIG. 1a, the image projection device 10 may be arranged at a distance $Z_{er}$ from the pupil P of an eye of a user of the portable optical data display system. The axis Z then corresponds to the optical axis of the gaze of the user of the system and is associated with the position of the eye in the plane (X,Y) of the orthogonal reference system (X,Y,Z). For example, the distance $Z_{er}$ (also called 'eye relief') may be equal to 20 mm for a portable optical data display system comprising a pair of glasses that are spectacles, or equal to 30 mm for a system comprising an AR or VR/MR immersion headset.

The image projection device 10 comprises an emission surface S, generally extending in the plane (X,Y) and formed of $(M_x \times M_y)$ emission points, denoted $EP_{pq}$. Each emission point $EP_{pq}$ corresponds to the intersection of a waveguide $g_p$ and an electrode $e_q$. Each emission point $EP_{pq}$ is designed to emit a light wave propagating along a propagation axis (or wave vector) $\vec{k}$, from the emission surface S to the pupil P, which then focuses the light onto the retina R of the eye. The emission surface S then corresponds to a retinal projection screen.

Figure 1B:
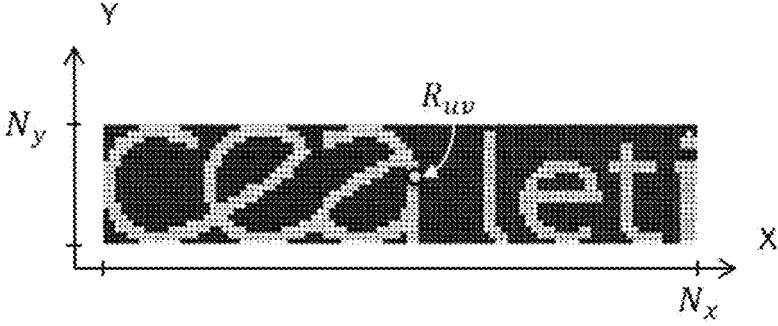
FIG. 1b is a diagram showing one example of an image to be projected onto an eye of a user of a portable optical data display system, according to some embodiments of the invention.

The image projection device 10 is designed to project an image of size $(N_x \times N_y)$ in terms of number of pixels and substantially defined in the plane of projection of the retina R of the eye. FIG. 1b shows one example of an image to be projected onto an eye of a user. Each projected pixel then corresponds to an illuminated point $R_{uv}$ on the retina R.

The numbers $N_x$ and $N_y$ are positive integers whose product $(N_x \times N_y)$ is strictly greater than 1. The parameter u denoting an index associated with the pixels of the image on the axis X, with $u \in [1, N_x]$, and the parameter v denoting an index associated with the pixels of the image along the axis Y, with $v \in [1, N_y]$. For example and without limitation, a minimum number of the product of the integers $(N_x \times N_y)$ may be equal to 100 pixels of an image to be projected.

The set of $(M_x \times M_y)$ emission points $EP_{pq}$ is then distributed into $(N_x \times N_y)$ subsets of emission points. These subsets of emission points are also called 'emission point distributions' and are denoted by the notation $EPD_{uv}$. It should be noted that a minimum number of the product of the integers $(M_x \times M_y)$ may be defined based on the maximization of the number of emission point distributions $(N_x \times N_y)$ on the emission surface S (that is to say pixels to be projected) and of the number $n_{em/EPD}$ of emission points $EP_{pq}$ per emission point distribution $EPD_{uv}$. For example and without limitation, the number $n_{em/EPD}$ may be between 50 and 200, and the minimum number of the product of the integers $(M_x \times M_y)$ may therefore be equal to 5000 emission points $EP_{pq}$.

Each emission point distribution $EPD_{uv}$ may be formed such that all of the emission points $EP_{pq}$ of one and the same distribution all emit a phase-matched light wave along one and the same propagation axis $\vec{k}_{uv}$. It should be noted that a first light wave and a second light wave each having one and the same propagation axis $\vec{k}_{uv}$ are phase-matched if, in a plane perpendicular to $\vec{k}_{uv}$, the value of the phase of the second light wave is substantially equal to the value of the phase of the first light wave modulo $2\pi$. The light waves emitted by the emission points $EP_{pq}$ of one and the same distribution may therefore propagate in parallel between the image projection device 10 and the pupil P of the eye over the distance $Z_{er}$, and converge substantially at the same point $R_{uv}$ on the retina by virtue of the lens C of the eye, as shown in FIG. 1a. In this case, the eye perceives the projected image by accommodating to infinity. According to one variant that is not shown in the figures, the phase-matched light waves emitted by the emission points $EP_{pq}$ of one and the same distribution $EPD_{uv}$ may propagate in substantially divergent directions $\vec{k}'_{uv}$ around a direction $\vec{k}_{uv}$ that targets the point $R_{uv}$ (that is to say pixel of indices (u, v)) in the field of view. In this case, the eye perceives the projected image by accommodating at a distance, referred to as accommodation distance and denoted $d_a$, which may be a few metres (that is to say $d_a$ is not equal to infinity). For example and without limitation, the accommodation distance $d_a$ may be 2 m. The degree of divergence of a direction $\vec{k}$ of one and/or more emission points $EP_{pq}$ from the direction $\vec{k}_{uv}$ may then be determined based on the accommodation distance $d_a$. The light intensity at the point $R_{uv}$ results from the contribution of each light wave from the emission points $EP_{pq}$. The emission point distribution $EPD_{uv}$ is phase-adjusted and forms a resultant light wave. The resultant light wave from $EPD_{uv}$ may be associated with a plane wave or a substantially spherical wave if the accommodation distance $d_a$ of the image projected onto the retina is not infinity. Advantageously, the distribution of the emission points $EP_{pq}$ for each emission point distribution $EPD_{uv}$ may be determined randomly or pseudo-randomly.

Figure 2:
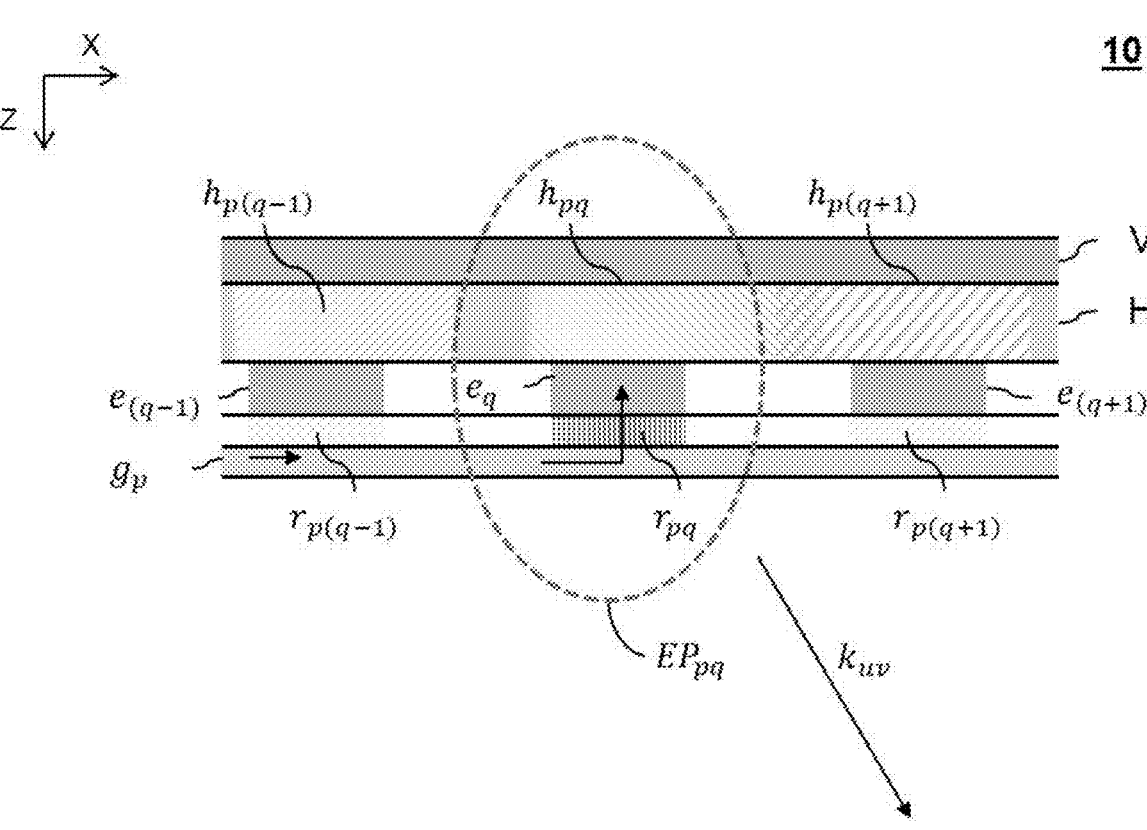
FIG. 2 is a diagram showing a cross section of the structure of the emission surface of an image projection device along the plane (X,Z), according to some embodiments of the invention.

FIG. 2 schematically shows a cross section of the structure of the emission surface S of the image projection device 10 along the plane (X,Z). This structure comprises a stack of multiple layers that are superimposed in the direction of the axis Z.

The device 10 comprises a first layer corresponding to the set of $M_x$ waveguides $g_p$ arranged parallel to the emission surface S. Each waveguide $g_p$ extends on either side of the emission surface S, from an initial position to a final position that are arranged along an axis of extension X' substantially parallel to the longitudinal axis X. For simplicity, in FIGS. 1(a) and 2, the waveguides $g_p$ are schematically shown in a rectilinear shape along the axis X. However, those skilled in the art will readily understand that the invention is not limited to such a waveguide configuration shape.

The waveguides $g_p$ are configured to receive coherent light, emitted by one or more laser sources (not shown in the figures), and to propagate the coherent light along the emission surface S. The waveguides $g_p$ may for example be formed of silicon nitride, and have a width $(g_p)$, in the direction of the axis Y in FIG. 1$a$, and a thickness $(g_z)$, in the direction of the axis Z, that are both between 100 nm and 600 nm.

The device also comprises a second layer corresponding to the set of $M_y$ electrodes $e_q$ arranged parallel to the emission surface S. Each electrode $e_q$ extends on either side of the emission surface S, from an initial position to a final position that are arranged along an axis of extension Y' substantially parallel to the transverse axis Y. For simplicity, in FIG. 1$a$, the electrodes $e_q$ are shown schematically in a rectilinear shape in the direction of the axis Y. However, those skilled in the art will readily understand that the invention is not limited to such an electrode configuration shape.

The electrodes $e_q$ are configured to receive a specific bias voltage (or electrical modulation), managed by one or more power supplies (not shown in the figures), and to propagate the electrical modulation along the emission surface S. The electrodes $e_q$ are made of a conductive material, for example, for transparent electrodes, this conductive material may be indium tin oxide. The electrodes $e_q$ may have a width $(e_x)$, in the direction of the axis X in FIG. 1$a$, of between 2 $\mu$m and 10 $\mu$m, and a thickness $(e_z)$, in the direction of the axis Z, depending on the conductive material. For example, the thickness $(e_z)$ of electrodes $e_q$ made of indium tin oxide may typically be between 20 nm and 100 nm.

The set of $M_y$ electrodes $e_q$ is superimposed on the set of $M_y$ waveguides $g_p$, parallel to the emission surface S. Each electrode $e_q$ thus 'crosses' multiple waveguides $g_p$, so as to define multiple intersections (or crossings). Each intersection corresponds to a position of an emission point $EP_{pq}$. As used here, the term 'intersection' refers to a superposition of a waveguide $g_p$ (that is to say first layer) and an electrode $e_q$ (that is to say second layer) that are not parallel to one another.

The device 10 furthermore comprises a third layer, contained between the first and second layer, corresponding to a set of $(M_x \times M_y)$ diffraction gratings, denoted $r_{pq}$. Each diffraction grating $r_{qp}$ is optically coupled to a waveguide $g_p$ and is joined to an electrode $e_p$. Each diffraction grating $r_{qp}$ is formed from a periodic variation of at least one material with a refractive index able to be modulated by applying a bias voltage passing through the electrode $e_p$.

The third layer comprising the set of diffraction gratings $r_{pq}$ may consist of a continuous structure in the plane (X,Y) of the emission surface S. Alternatively, the third layer may also consist of structures located in the plane (X,Y) of the emission surface S and positioned substantially at the intersections formed by the waveguides $g_p$ and the electrodes $e_q$. The continuous structure or the localized structures may be formed for example by inclusions defining a pattern with a periodic variation in silicon oxide. The inclusions may then consist of any material having an electrically adjustable refractive index, such as for example a liquid crystal. When the wavelength of the light emitted by a laser source is 532 nm, the period of the pattern of the diffraction grating $r_{pq}$ may be between 300 nm and 400 nm. A diffraction grating may be spread in a range of periodic patterns over a length $(r_x)$ and spread over a width $(r_y)$. These quantities $(r_x)$ and $(r_y)$ may be defined based on the zones of superposition formed by the waveguides $g_p$ and the electrodes $e_q$. For example, the diffraction grating may be spread over 10 periodic patterns such that the length $(r_x)$ may be greater than or substantially equal to the width $(e_x)$ of the electrodes $e_p$ inducing the modulation of the refractive index. The third layer comprising the set of diffraction gratings may have a thickness $(r_z)$ of for example between 100 nm and 500 nm.

The device 10 may comprise a set of light wave orientation elements configured to control a light wave. As used here, the expression "light wave control" (also referred to as 'light wave manipulation') refers to various phenomena related to electromagnetic waves that may occur when an optical beam interacts notably with the material of a given object, as shown with the element $h_{pq}$ in FIG. 2. These phenomena comprise notably angular deviation, phase change, transmission, reflection, absorption, scattering, refraction and/or diffraction of the electromagnetic wave.

Advantageously, the device 10 may comprise a fourth layer H, positioned on the second layer, comprising the set of light wave orientation elements configured to control a light wave. The fourth layer H may be a holographic film comprising a set of $(M_x \times M_y)$ holograms, denoted $h_{pq}$. Each hologram $h_{pq}$ corresponds to a (reflective or transmissive) orientation element and is associated with a diffraction grating $r_{pq}$ along the axis Z. The holographic film may be a photopolymer, for example polymethyl methacrylate, or a photoresist, with a thickness $(h_z)$ of between 2 $\mu$m and 20 $\mu$m. A hologram recorded (or encoded) on the holographic film may extend over a length $(h_x)$ of between 2 $\mu$m and 20 $\mu$m, and a width $(h_y)$ of between 1 $\mu$m and 10 $\mu$m. The quantities $(h_x)$ and $(h_y)$ of the holograms may be defined based on the zones of superposition formed by the waveguides $g_p$ and the electrodes $e_q$. Advantageously, the length $(h_x)$ may be greater than the width $(e_x)$ of the electrodes $e_p$ inducing holograms that are contiguous or overlap in pairs, as shown in FIG. 2 for the holograms $h_{pq}$ and $h_{p(q-1)}$, making it possible for example to reduce the minimum distance between two electrodes.

The stack of the various layers and elements of the structure of the device 10 is arranged on a support V. The support V may be a transparent support made of glass or polycarbonate and contained in a spectacle lens or a visor of the transparent portable optical data display system.

In FIG. 2, a single waveguide $g_p$, coupled to three point diffraction gratings $T_{p(q+1)}$, $r_{pq}$ and $r_{p(q-1)}$, three different electrodes $e_{(q+1)}$, $e_q$ and $e_{(q-1)}$ and three point holograms $h_{p(q+1)}$, $h_{pq}$ and $h_{p(q-1)}$ are shown by way of simplification and non-limiting example. Those skilled in the art will readily understand that the invention is not limited to such numbers and configurations of waveguides, diffraction gratings and electrodes.

In FIG. 2, the emission volume (that is to say the emission point $EP_{pq}$) thus corresponds to a superposition, parallel to the emission surface S, of the waveguide $g_p$ and of the electrode $e_q$, coupled to the point diffraction grating $r_{pq}$ and associated with the hologram $h_{pq}$. To activate the emission point $EP_{pq}$, that is to say to "make it emit", the image projection device 10 is configured to transmit coherent light to the waveguide $g_p$ and to electrically modulate (or bias) the electrode $e_q$. Part of the light wave propagating in the waveguide $g_p$ is then extracted at the diffraction grating $r_{pq}$ coupled to the refractive index modified by the electrode $e_q$, as shown in FIG. 2 by the arrow. The light extracted at the diffraction grating $r_{pq}$ propagates in the hologram $h_{pq}$ (that is to say an orientation element), such that the device 10 emits, at the output of the hologram $h_{pq}$, spatially at the emission point $EP_{pq}$, a light wave with a wave vector $\vec{K}_{uv}$ and a phase shift that are predetermined and stored (that is to say recorded or encoded beforehand) in the hologram $h_{pq}$. The light waves emitted by various emission points $EP_{pq}$ of one and the same distribution $EPD_{uv}$ are phase-matched with respect to one another with the same wave vector $\vec{k}_{uv}$ so that the set of these light waves forms a resultant wave the wavefront of which is controlled, for example a plane wave for accommodation to infinity, or a spherical wave for accommodation at the accommodation distance $d_a$. This resultant wave propagates to the pupil P so as to form a single light spot $R_{uv}$ at the retina R. The phase and the direction of the light wave emitted by an emission point $EP_{pq}$ depend on the phase information recorded in the hologram $h_{pq}$.

Each distribution $EPD_{uv}$ therefore makes it possible to form a light spot that is perceived by the user and associated with a pixel of an image. An image may be formed by successively illuminating various emission point distributions $EPD_{uv}$, so as to form an image comprising a large number of pixels. The illumination frequency of the various emission point distributions $EPD_{uv}$ is dimensioned such that the user is able to experience the formation of a still image under the effect of retinal persistence, despite technically sequential formation of the various pixels of the image.

Figure 3:
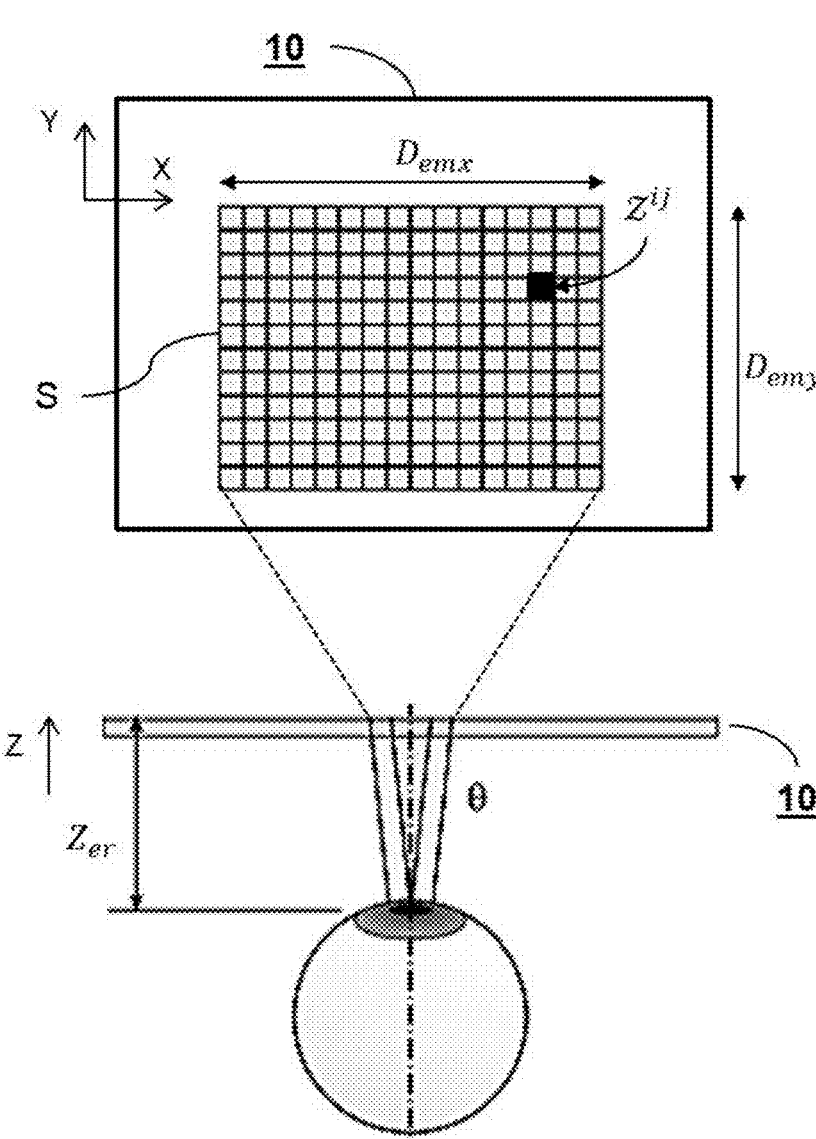
FIG. 3 is a diagram showing a discretization of the emission surface of an image projection device in the plane (X,Y), according to some embodiments of the invention.

In a first embodiment, the emission surface S may be discretized into $(L_x \times L_y)$ elementary emission zones denoted $Z^{ij}$ forming a continuous mesh of the emission surface S in the plane (X,Y), as shown in FIG. 3.

The numbers $L_y$ and $L_y$ are positive integers whose product $(L_x \times L_y)$ is strictly greater than 1. The parameter i is an index associated with a discretization of the emission surface S along the axis X, with $i \in [1, L_x]$, and the parameter j is an index associated with a discretization of the emission surface S along the axis Y, with $j \in [1, L_y]$. For example and without limitation, a minimum number of the product of the integers $(L_x \times L_y)$ may be equal to $(1 \times 2)$ or $(2 \times 1)$ elementary emission zones.

Each elementary emission zone $Z^{ij}$ may be associated with a number $$m_x^{ij}$$

of waveguides $$g_p^{ij},$$

with $$m_x^{ij} \in [1_1 M_x],$$

and with a number $$m_y^{ij}$$

of electrodes $$e_q^{ij},$$

with $$m_y^{ij} \in [1, M_y],$$

as illustrated in FIG. 4.

An elementary emission zone $Z^{ij}$ therefore comprises a subset of $$\left( m_x^{ij} \times m_y^{ij} \right)$$

emission points $$EP_{pq}^{ij}$$

defined among the $(M_x \times M_y)$ emission points $EP_{pq}$ of the emission surface S.

Each elementary emission zone $Z^{ij}$ may be associated with a finite number of emission point distributions, which are then denoted $$EPD_{uv}^{ij}.$$

Each emission point distribution EPD $$EPD_{uv}^{ij}$$

of an elementary emission zone $Z^{ij}$ consists of one or more emission points $$EP_{pq}^{ij}$$

determined only among the $$\left( m_x^{ij} \times m_y^{ij} \right)$$

emission points $$EP_{pq}^{ij}$$

of the elementary emission zone $Z^{ij}$.

Advantageously, for each elementary emission zone $Z^{ij}$, the distribution of the emission points $$EP_{pq}^{ij}$$

for each emission point distribution $$EPD_{uv}^{ij}$$

may be determined randomly or pseudo-randomly. For example and without limitation, the distribution of the emission points $$EP_{pq}^{ij}$$

may be determined from the random or pseudo-random selection of $$m_x^{ij}$$

indices p and $$m_y^{ij}$$

indices q associated respectively with the various waveguides $$g_p^{ij}$$

and with the various electrodes $$e_q^{ij}$$

making up the elementary emission zone $Z^{ij}$.

Each emission point distribution $$EPD_{uv}^{ij}$$

is associated with the point projected onto the retina R, which is then denoted $$R_{uv}^{ij}.$$

The number of emission point distributions $$EPD_{uv}^{ij}$$

of an elementary emission zone $Z^{ij}$ is thus equal to the number $$\left(n_x^{ij} \times n_y^{ij}\right)$$

of pixels of the image to be projected associated with the points $$R_{uv}^{ij}$$

projected onto the retina R by the elementary emission zone $Z^{ij}$. The integers $$n_x^{ij}$$

and $$n_y^{ij}$$

are numbers of pixels defined along the axis X and on the axis Y, respectively, with $$n_x^{ij} \in [1, N_x] \text{ and } n_y^{ij} \in [1, N_y].$$

For example, the $$\left(n_x^{ij} \times n_y^{ij}\right)$$

pixels of the image to be projected may be identical for each elementary emission zone $Z^{ij}$ of the emission surface S. The integers $$n_x^{ij}$$

and $$n_y^{ij}$$

may be defined based on the total number of pixels ($N_x \times N_y$) of the image to be projected and the total number of elementary zones ($L_x \times L_y$) discretizing the emission surface S, according to the following equations (01) and (02):

$$n_x^{ij} = \frac{N_x}{L_x} \tag{01}$$

$$n_y^{ij} = \frac{N_y}{L_y} \tag{02}$$

For example, an image to be projected may comprise (400×200) pixels and an emission surface S may be discretized into (16×12) elementary emission zones $Z^{ij}$. In this case, each zone $Z^{ij}$ may comprise for example (25×17) pixels of the image to be projected (that is to say points $$R_{uv}^{ij}$$

projected onto the retina R) from a number of (25×17) corresponding emission point distributions $$EPD_{uv}^{ij}.$$

If, for each elementary emission zone $Z^{ij}$, the numbers $$\left(n_x^{ij} \times n_y^{ij}\right)$$

of pixels of the image to be projected are identical, the indices $u^{ij}$ and $v^{ij}$ corresponding to the index intervals may be defined based on the indices (i, j) of the zone $Z^{ij}$, the total number of pixels ($N_x \times N_y$) of the image to be projected and the total number of elementary zones ($L_x \times L_y$) discretizing the emission surface S, and according to the following expressions (03) and (04):

$$u^{ij} \epsilon \left[ (i-1) \times \frac{N_x}{L_x} + 1; i \times \frac{N_x}{L_x} \right] \quad (03)$$

$$v^{ij} \epsilon \left[ (j-1) \times \frac{N_y}{L_y} + 1; j \times \frac{N_y}{L_y} \right] \quad (04)$$

For each elementary emission zone $Z^{ij}$, an emission point $$EP_{pq}^{ij}$$

of an emission point distribution $$EPD_{uv}^{ij}$$

may be associated with a wave vector $$\vec{k}_{uv}^{ij}$$

contained in an angular domain, represented by the angular ranges $\Delta\varphi$ and $\Delta\psi$, and defined based on the total number of elementary zones ($L_x \times L_y$) discretizing the emission surface S, according to the following equations (05) and (06):

$$\Delta\varphi = \frac{\theta_x}{L_x} \quad (05)$$

$$\Delta\psi = \frac{\theta_y}{L_y} \quad (06)$$

In the above equations (05) and (06), the quantities $\theta_x$ and $\theta_y$ correspond to angular projections respectively onto the axis X and the axis Y of the viewing cone $\theta$ (also called field of view or FOV) of the emission surface S of the image projection device 10 for an eye, as illustrated in FIGS. 3 and 5.

In particular, for each elementary emission zone $Z^{ij}$, the angular domain ($\Delta\varphi$, $\Delta\psi$) may be directed along a central vector $\vec{\kappa}^{ij}$ oriented from the elementary emission zone $Z^{ij}$ to a central point of impact $t^{ij}$ in the plane (X,Y) at the pupil P.

The angular direction of the central vector $\vec{\kappa}^{ij}$ in the plane (X,Y,Z) is characterized by angles $\overline{\varphi^{ij}}$ and $\overline{\psi^{ij}}$ determined relative to the optical axis Z in the planes (X,Z) and (Y,Z), respectively. By way of illustration, the projection $$\kappa_x^{ij}$$

into the plane (X,Z) of the central vector $\vec{\kappa}^{ij}$ of the angular domain of the elementary emission zone $Z^{ij}$ is shown in FIG. 5. The angle $\overline{\varphi^{ij}}$ corresponds to the angle between the optical axis Z and the direction of projection $$\kappa_x^{ij}$$

of the elementary emission zone $Z^{ij}$ to the coordinate $$t_x^{ij}$$

of the central point of impact $t^{ij}$ on the axis X, as shown in FIG. 5. The angles $\overline{\varphi^{ij}}$ and $\overline{\psi^{ij}}$ associated with the central vector $\vec{\kappa}^{ij}$ may be defined based on the angular domain, the total number of elementary zones ($L_x \times L_y$) discretizing the emission surface S and the position of the elementary emission zone $Z^{ij}$ on the emission surface S (represented for example by the indices (i, j) of the zone $Z^{ij}$). The angles $\overline{\varphi^{ij}}$ and $\overline{\psi^{ij}}$ associated with the central vector $\vec{\kappa}^{ij}$ may thus be defined according to the following equations (07) and (08):

$$\overline{\varphi^{ij}} = \Delta\varphi \times \left( i - \frac{L_x + 1}{2} \right) \quad (07)$$

$$\overline{\psi^{ij}} = \Delta\psi \times \left( j - \frac{L_y + 1}{2} \right) \quad (08)$$

Advantageously, for each emission point $$EP_{pq}^{ij}$$

corresponding to the intersection of a waveguide $g_p$ and an electrode $e_q$ of an emission point distribution $$EPD_{uv}^{ij}$$

of an elementary emission zone $Z^{ij}$ (as shown in FIG. 4), the angular direction of the wave vector $$\vec{k}_{uv}^{ij}$$

in the plane (X,Y,Z) may be characterized by angles $$\varphi_{uv}^{ij}$$

and $$\psi_{uv}^{ij}$$

determined with respect to the optical axis Z in the planes (X,Z) and (Y,Z), respectively. In particular, each hologram $h_{pq}$ associated with an emission point $$EP_{pq}^{ij}$$

of the emission point distribution $$EPD_{uv}^{ij}$$

may encode the angular directions $$\varphi_{uv}^{ij}$$

and $$\psi_{uv}^{ij}$$

defined according to the following equations (09) and (10):

$$\varphi_{uv}^{ij} = \left(u^{ij} - 1\right) \times \delta - \frac{\theta_x}{2} \qquad (09)$$

$$\psi_{uv}^{ij} = \left(v^{ij} - 1\right) \times \delta - \frac{\theta_y}{2} \qquad (10)$$

In the above equations (09) and (10), the quantity δ corresponds to the angular resolution of the image and depends on the desired level of sharpness on the display. For example, an angular resolution δ considered to be a visual limit value of angular resolution (that is to say a separable limit) corresponds to an angle of one arc minute equal to the angle of ⅟₆₀~0.02° (and converted into radians in the calculations in the above equations). It should be noted that the above equations (09) and (10) are therefore obtained with a small-angle approximation (that is to say tan δ≈δ). In this case, it may be considered that, below this value, the eye is not able to perceive the pixellation of an image to be projected onto the retina R.

For each elementary emission zone $Z^{ij}$, the beams emitted by the emission points $$EP_{pq}^{ij}$$

may impact the plane of the pupil P around the central point of impact $t^{ij}$ over an impact range $w^{ij}$. For example and without limitation, the impact range $w^{ij}$ may be considered to be uniform for all of the elementary emission zones $Z^{ij}$ of the emission surface S. The range $w^{ij}$ of the impacts of the emission points $$EP_{pq}^{ij}$$

in the plane of the pupil P may notably take into account the range of the angular domain of the elementary emission zone $Z^{ij}$ and the contribution of a diffraction of the emission points.

The coordinates $$t_x^{ij}$$

and $$t_y^{ij}$$

of the central point of impact $t^{ij}$ on the axis X and the axis Y, respectively, in the plane of the pupil P, may be expressed according to the following equations (11) and (12):

$$t_x^{ij} = \left(i - \frac{L_x + 1}{2}\right) \times d_{emx}^{ij} + \left(\overline{\varphi^{ij}} \times Z_{er}\right) \qquad (11)$$

$$t_y^{ij} = \left(j - \frac{L_y + 1}{2}\right) \times d_{emy}^{ij} + \left(\overline{\psi^{ij}} \times Z_{er}\right) \qquad (12)$$

In the above equations (11) and (12), the quantities $$d_{emx}^{ij}$$

and $$d_{emy}^{ij}$$

correspond to the size of the elementary emission zone $Z^{ij}$ along the axis X and the axis Y, respectively, as shown in FIG. 5. The sizes $$d_{emx}^{ij}$$

and $$d_{emy}^{ij}$$

may depend on the dimensions associated with the waveguides and with the electrodes, their distribution in the plane of the emission surface S, as well as the numbers $$m_x^{ij}$$

of waveguides $g_p$ and $$m_y^{ij}$$

of electrodes $e_q$ of the elementary zone $Z^{ij}$.

The discretization of the emission surface S into elementary emission zones $Z^{ij}$ may be uniform, the quantities $$d_{emx}^{ij}$$

and $$d_{emy}^{ij}$$

then being values of constant sizes for all of the elementary zones $Z^{ij}$, and being able to be defined based on the size of the emission surface S and the total number of elementary zones ($L_x \times L_y$) discretizing the surface S, according to the following equations (13) and (14):

$$d_{emx}^{ij} = \frac{D_{emx}}{L_x} \tag{13}$$

$$d_{emy}^{ij} = \frac{D_{emy}}{L_y} \tag{14}$$

For example and without limitation, the quantities $$d_{emx}^{ij}$$

and $$d_{emy}^{ij}$$

may be equivalent to one and the same quantity $\phi$ equal to 0.5 mm. In the above equations (13) and (14), the quantities $D_{emx}$ and $D_{emy}$ correspond to the size of the emission surface S along the axis X and the axis Y, respectively, as shown in FIGS. 3 and 5. In particular, the size of the emission surface S may be determined as a function of the diameter $D_{pup}$ of the pupil of the eye (which is typically non-negligible and typically chosen to be equal to 4 mm). Indeed, the size of the emission surface S may be determined so as to be greater than the size of a zone covered solely by taking into account the viewing cone $\theta$, that is to say by taking into account the diameter $D_{pup}$ of the pupil. The quantities $D_{emx}$ and $D_{emy}$ may then be defined, with a small-angle approximation, according to the following equations (15) and (16):

$$D_{emx} = (Z_{er} \times \delta \times N_x) + D_{pup} \tag{15}$$

$$D_{emy} = (Z_{er} \times \delta \times N_y) + D_{pup} \tag{16}$$

The discretization of the emission surface S into elementary emission zones $Z^{ij}$ may also be uniform, the number $$m_x^{ij}$$

of waveguides $g_p$ in an elementary zone and the number $$m_y^{ij}$$

of electrodes $e_q$ in an elementary zone then being constant values for all of the elementary zones $Z^{ij}$ and being able to be defined based on the total number of ($M_x \times M_y$) emission points of the emission surface S and the total number of elementary zones ($L_x \times L_y$) discretizing the surface S, according to the following equations (17) and (18):

$$m_x^{ij} = \frac{M_x}{L_x} \tag{17}$$

$$m_y^{ij} = \frac{M_y}{L_y} \tag{18}$$

Alternatively, the discretization of the emission surface S into elementary zones $Z^{ij}$ may be non-uniform, the number $$m_x^{ij}$$

of waveguides $g_p$ and the number $$m_y^{ij}$$

of electrodes $e_q$ being defined for example according to increasing and/or decreasing functions as a function of the axes X and Y, respectively. The non-uniformity of the discretization of the emission surface S into elementary zones $Z^{ij}$ may similarly result in non-homogeneous quantities $$d_{emx}^{ij}$$

and $$d_{emy}^{ij}$$

as a function of the axes X and Y, respectively.

In particular, it should be noted that the quantities associated with the emission surface S and with the various elementary zones are expressed, in the above equations, using the small-angle approximation for simplification. This approximation is applicable for a small emission surface S size (that is to say a small viewing cone $\theta$) and/or an emission surface S centred with respect to the optical axis Z of the gaze of the user of the system. Alternatively, if the small-angle approximation might no longer be applicable (that is to say tan $\delta \neq \delta$), the formulas of the above equations, notably (09), (10), (15) and (16), are more complex. In this case, some peripheral elementary zones of an emission surface S may be widened in the plane (X,Y) for high viewing angles compared to the elementary zones referred to as central zones with respect to the optical axis Z of this same emission surface S.

FIG. 6 shows a diagram of the set of impact ranges $w^{ij}$ (that is to say illumination zones on the pupil) at the positions of the central point of impact $t^{ij}$ for an emission surface S discretized for example into (16×12) elementary emission zones $Z^{ij}$ of dimension $\phi$ equal to 0.5 mm and according to a field of view defined by quantities $\theta_x$ and $\theta_y$ equal to (12°, 6°). In this example, the emission points $EP_{pq}$ have similar sizes over the entire emission surface S, defined by a diameter $\omega_1$ of 4 μm. Thus, for each elementary emission zone $Z^{ij}$, the dimension of the impact range $w^{ij}$ (that is to say the diffraction 'spot' at the eye) is equal to 850 μm.

As shown in FIG. 6, depending on the dimensioning of the device 10 and in general of the transparent portable optical data display system, some coordinates $$t_x^{ij}$$

and $$t_y^{ij}$$

of the central point of impact $t^{ij}$ of an elementary emission zone $Z^{ij}$ may be positioned outside the pupil P on the plane (X,Y). In this case, at least some of the pixels associated with the indices $u^{ij}$ and $v^{ij}$ are not projected onto the retina R of the eye because at least some of the light energy associated with the emission points $$EP_{pq}^{ij}$$

of the emission point distributions $$EPD_{uv}^{ij}$$

does not enter the pupil represented by the circle P in FIG. 6.

However, this effect is partly compensated for by the orientation of the eye in its orbit, leading to a displacement of the position of the pupil P. Indeed, as illustrated by the circle P' in dotted lines in FIG. 6, the position of the pupil may be shifted in the plane (X,Y) when the eye targets a direction different from the direction of the optical axis Z. In FIG. 6, and according to the dimensioning shown, the shift in the position of the pupil P' represents a target in a direction −6°: +3°, that is to say the direction concerned by the emission of a light signal from the elementary emission zone $Z^{01,01}$. In this case, the associated pixels may be projected onto the retina R of the eye because the light energy associated with the emission points $$EP_{pq}^{ij}$$

of the emission point distributions $$EPD_{uv}^{ij}$$

enters the pupil P'. The movement of the eye in its orbit therefore makes it possible to manage signal dispersion in the plane of the pupil.

Advantageously, in order to extend the viewing cone $\theta$ of the image projection device 10 for an eye, that is to say the angular range of image projection, the emission surface S may be reproduced in the plane (X,Y). In particular, the image projection device 10 may comprise a finite number of distinct emission surfaces $S^{xy}$ distributed in the plane (X,Y). For each emission surface $S^{xy}$, each hologram $h_{pq}$ associated with an emission point $$EP_{pq}^{ij}$$

of an emission point distribution $$EPD_{uv}^{ij}$$

may encode the angular directions $$\varphi_{uv}^{ij}$$

and $$\psi_{uv}^{ij}$$

determined with respect to an optical axis $Z^{xy}$ rotated in the planes (X,Z) and (Y,Z) and centred with respect to the point $Pr^{xy}$ corresponding to the position of the centre of the pupil of the eye after rotation in its orbit and in the angular direction of the zone of the emission surface $S^{xy}$ in question. The image projection device 10 shown schematically in FIG. 7a shows the emission surfaces $S^1$, $S^2$ and $S^3$ positioned consecutively along the axis X and having different angular cone projections along the optical axis $Z^1=Z$ and the rotated optical axes $Z^2$ and $Z^3$ centred respectively on the points $Pr^1$, $Pr^2$ and $Pr^3$ of the projection of the centre of the pupil P onto the axis X.

In particular, in the case of the optical axes $Z^{xy}$ rotated with respect to the optical axis Z of the gaze of the user of the system, the small-angle approximation might no longer be applicable (that is to say tan $\delta \neq \delta$) for high viewing angles. In this case, the emission surfaces $S^{xy}$ may be widened in the plane (X,Y) for high viewing angles compared to what is referred to as a central emission surface with respect to the optical axis Z. In FIG. 7a, the emission surfaces $S^2$ and $S^3$, associated with the rotated optical axes $Z^2$ and $Z^3$, are larger than the central emission surface $S^1$ associated with the optical axis $Z=Z^1$.

In addition, to extend the size of the "eye box", that is to say the zone in which the user (and therefore their eye) is able to move in front of the image projection device 10 while still viewing the entire image, the emission surface S may also be duplicated in the plane (X,Y). In this case, the image projection device 10 may comprise a finite number of one and the same emission surface S distributed in the plane (X,Y). For each distributed emission surface S, each hologram $h_{pq}$ associated with an emission point $$EP^{ij}_{pq}$$

of an emission point distribution $$EPD^{ij}_{uv}$$

may encode the angular directions $$\varphi^{ij}_{uv}$$

and $$\psi^{ij}_{uv}$$

determined with respect to the optical axis Z in the planes (X,Z) and (Y,Z) and centred with respect to the point $Pt^{xy}$ corresponding to the position of the centre of the pupil of the eye after translation in the plane (X,Y). The image projection device 10 shown schematically in FIG. 7b shows, three times, the same emission surface S positioned consecutively along the axis X and having the same three angular cone projections $\theta_x$ along the optical axis Z centred respectively on the points $Pt^1$, $Pt^2$ and $Pt^3$ of the projection of the centre of the pupil P translated on the axis X.

For example and without limitation, in the cases shown schematically in FIGS. 7a and 7b, in order to duplicate or reproduce emission surfaces, the length of the waveguides $g_p$ may be extended along the axis X, and sets of $M_y$ electrodes $e_q$ may be duplicated (notably three times here) in the longitudinal direction of the guides so as to form emission surfaces S and/or $S^1$, $S^2$ and $S^3$. Similarly, the length of the electrodes $e_q$ may be extended along the axis Y, and sets of $M_x$ waveguides $g_p$ may be duplicated in the transverse direction of the guides so as to form new emission surfaces S and/or $S^{xy}$.

The discretization of the emission surface S into elementary emission zones $Z^{ij}$ makes it possible to significantly increase the densification of the emission points $$EP^{ij}_{pq}$$

of one and the same emission point distribution $$EPD^{ij}_{uv}.$$

In particular, the density ρ of the emission points may be defined according to the following expression (19):

$$\rho = \frac{1}{\phi^2} \times \left[ \left( Z^2_{er} \times \delta^2 \right) + \left( \frac{D^2_{pup}}{N_x \times N_y} \right) + \left( Z_{er} \times \delta \times D_{pup} \times \frac{N_x + N_y}{N_x \times N_y} \right) \right] \tag{19}$$

The number $n_{em/EPD}$ of emission points $EP_{pq}$ of one and the same emission point distribution may be approximated based on the size of the emission surface S, the surface area $s_{em}$ of the emission point $EP_{pq}$, and the number of pixels $(N_x \times N_y)$ of the image to be projected, as defined according to the following expression (20):

$$n_{em/EPD} = \frac{D_{emx} \times D_{emy}}{s_{em} \times (N_x \times N_y)} \tag{20}$$

For example and without limitation, the number $n_{em/EPD}$ may be equal to around 50. For an image to be projected of (400×200) pixels and a discretization of the emission surface S into (16×12) elementary emission zones $Z^{ij}$, the density ρ of emission points $$EP^{ij}_{pq}$$

of one and the same emission point distribution $$EPD^{ij}_{uv}$$

may be equal, according to the above equation (19), to around 0.24%. In the above equation (20), the surface area $s_{em}$ of the emission point $EP_{pq}$ may be defined based on the diameter $\omega_1$ of the emission point $EP_{pq}$ according to the following expression (21):

$$s_{em} = \pi \times \frac{\omega^2_1}{4} \tag{21}$$

It should be noted that there is at least one criterion for quantifying the quality of the image formed on the retina R by self-focusing of the emission points $EP_{pq}$ of one and the same emission point distribution $EPD_{uv}$. In particular, to quantify the efficiency of the self-focusing, a power ratio denoted γ may be defined based on the spatial distribution of the intensity of the percussive response (referred to by the acronym PSF, or point spread function), formed by an emission point distribution $EPD_{uv}$ at a point $R_{uv}$ on the retina R of the eye, as shown in FIG. 8a. The power ratio γ may be expressed according to the following expression (22):

$$\gamma = -10 \log_{10} \frac{P_1}{P_1 + P_2}$$

In the above equation (22), the quantity $P_1$ corresponds to the power of the central intensity peak formed by the emission point distribution $EPD_{uv}$, that is to say the area of the central peak shown in light grey in FIG. 8a. $P_1 + P_2$ denotes the total luminous power, the quantity $P_2$ corresponding to the power of the intensity noise formed by the emission point distribution $EPD_{uv}$, that is to say the peripheral zone of the central peak shown in dark grey of the central peak shown in grey.

The power ratio γ is optimum for a zero power $P_2$ of the intensity noise formed by the emission point (value of γ tending towards 0). FIG. 8b shows the evolution of the power ratio γ according to the variation in the density ρ of the emission points $EP_{pq}$ of one and the same emission point distribution $EPD_{uv}$, and as a function of various characteristic parameters (for example characteristic dimensions) of the transparent portable optical data display system. The criterion $\gamma$ for quantifying the quality of the image is therefore well related to the distribution surface density of the emission points $EP_{pq}$ on the emission surface S, as illustrated in FIG. 8b. Now, the discretization of the emission surface S into elementary emission zones $Z^{ij}$ makes it possible to significantly increase the densification of the emission points $$EP_{pq}^{ij}$$

of one and the same emission point distribution $$EPD_{uv}^{ij},$$

thereby thus allowing a significant gain (of at least 9 dB) on the value of the criterion $\gamma$ compared to a configuration without discretization of the surface (that is to say for $\rho_0=0.001\%$).

FIG. 9 illustrates the results of image simulations for various comparative dimensions of the image projection device 10. In particular, the simulation results are carried out on the basis of the discretization of the emission surface S via the number $(L_x \times L_y)$ of elementary zones $Z^{ij}$, on the one hand, and on the basis of the size of the emission points $EP_{pq}$ defined by the diameter $\omega_1$, on the other hand, and for an image to be projected of (400×200) pixels showing the words "CEA Ieti Retinal Projection". In particular, the variation in the number $(L_x \times L_y)$ of elementary zones $Z^{ij}$ induces a variation in the size of the emission zone ($\phi$ or more generally the quantities $$d_{emx}^{ij}$$

and $$d_{emy}^{ij}$$

and thus a variation in the density $\rho$ of the emission points $EP_{pq}$ for each emission point distribution $EPD_{uv}$.

As illustrated by the image simulation results in FIG. 9, implementing the discretization of the emission surface S, and then reducing the size of the emission zone (that is to say increasing the density), makes it possible to improve the contrast of the image to be projected. However, the increase in the size of the emission zone induces a reduction in blur on the image to be projected. It should also be noted that the reduction in the size of the emission points (that is to say small diameter value $\omega_1$) induces an increase in the proportion of the extent of intensity noise formed by the emission points compared to the central emission peak, and thus a reduction in the impact of this noise on the construction of the image on the retina R. Therefore, the image simulation results, illustrated in FIG. 9, make it possible to indicate possible optimum dimensioning with emission points of between 2 μm and 4 μm in diameter and an elementary emission zone size $Z^{ij}$ of between 200 μm and 800 μm.

The manufacture of an image projection device 10 is implemented based on a method comprising a design phase and a phase of physically manufacturing the device 10 thus designed.

FIG. 10 is a flowchart showing steps of the phase of designing the image projection device 10, according to some embodiments of the invention.

The phase of designing the image projection device may for example be computer-implemented.

In step 120, a discretization of the emission surface S into $(L_x \times L_y)$ elementary emission zones $Z^{ij}$ may be applied, such that each elementary emission zone $Z^{ij}$ comprises a subset of $$\left( m_x^{ij} \times m_y^{ij} \right)$$

emission points $$EP_{pq}^{ij}.$$

In step 140, a distribution of the subset of $$\left( m_x^{ij} \times m_y^{ij} \right)$$

emission points $$EP_{pq}^{ij}$$

into $$\left( n_x^{ij} \times n_y^{ij} \right)$$

emission point distributions $$EPD_{uv}^{ij}$$

is carried out.

In step 160, for each elementary emission zone $Z^{ij}$, the $$\left( n_x^{ij} \times n_y^{ij} \right)$$

emission point distributions $$EPD_{uv}^{ij}$$

are assigned to (that is to say associated with or allocated to)

$$\left( n_x^{ij} \times n_y^{ij} \right)$$

pixels of the image to be projected.

In step 180, for each emission point distribution $$EPD_{uv}^{ij},$$

the direction of the wave vector $$\vec{k}_{uv}^{ij}$$

of the resultant light wave emitted by the emission points $$EP_{pq}^{ij}$$

of the emission point distribution $$EPD_{uv}^{ij}$$

is determined such that the direction $$\vec{k}_{uv}^{ij}$$

is contained in an angular domain directed along a central vector $\vec{\kappa}^{ij}$ defined based on the number $(L_x \times L_y)$ of elementary emission zones $Z^{ij}$ discretizing the emission surface S and the position of the elementary emission zone $Z^{ij}$ on the emission surface S.

FIG. 11a is a flowchart showing examples of sub-steps of step 120 of discretizing the emission surface S in the phase of designing the image projection device 10, according to some embodiments of the invention.

In sub-step 102, the resolution of the image to be projected may be determined. For example, the resolution $(N_x \times N_y)$ of the image to be projected may be chosen to be equal to (400×200). In sub-step 104, the size of the field of view may be determined. For example, the quantities $\theta_x$ and $\theta_y$ of the field of view may be chosen to be equal to 12° and 6°, respectively. In sub-step 106, the distance of the eye relief may be determined. For example, the distance $Z_{er}$ of the eye relief may be chosen to be equal to 20 mm. In sub-step 108, the size of the emission surface S may be calculated based on the values fixed in sub-steps 102 to 106. According to the equations (15) and (16), the quantities $D_{emx}$ and $D_{emy}$ of the emission surface S may be equal to around 8 mm and 6 mm, respectively.

In sub-step 110, the size of the elementary emission zones $Z^{ij}$ may be determined. For example, the quantities $$d_{emx}^{ij}$$

and $$d_{emy}^{ij}$$

of the elementary emission zones may be chosen to be equal to 500 µm. In sub-step 112, the number of elementary emission zones $Z^{ij}$ may be calculated from the quantities $D_{emx}$ and $D_{emy}$ and the values fixed in sub-step 110. According to the equations (13) and (14), the number $(L_x \times L_y)$ of elementary emission zones $Z^{ij}$ may be equal to around (19×12). The number of pixels defined per elementary emission zone $Z^{ij}$ may then be deduced from the results of sub-step 110 and from the values fixed in sub-step 102. For example, the number $$\left( n_x^{ij} \times n_y^{ij} \right)$$

of pixels, that is to say emission point distribution, to be encoded per elementary emission zone may be equal to around 350.

Advantageously, in sub-step 114, widths $e_x$ and $g_p$ and configurations of the waveguides $g_p$ and electrodes $e_q$ may be determined. In sub-step 116, the numbers $$\left( m_x^{ij} \times m_y^{ij} \right)$$

of waveguides $g_p$ and electrodes $e_q$ per elementary emission zone $Z^{ij}$ may be calculated based on the results of sub-step 114. And, in sub-step 118, the maximum number $n_{em/EPD}$ of emission points per emission point distribution may be calculated based on the numbers of waveguides $g_p$ and electrodes $e_q$, and on the resolution of the image to be projected (or number $$\left( n_x^{ij} \times n_y^{ij} \right)$$

of pixels, that is to say emission point distribution, per elementary emission zone $Z^{ij}$, for example).

FIG. 11b is a flowchart showing examples of sub-steps of step 140 of distributing the emission points of a distribution $$EPD_{uv}^{ij}$$

in the phase of designing the image projection device 10, according to some embodiments of the invention.

In sub-step 122, the number of waveguides $g_p$ and the number of electrodes $e_q$ may be determined by random and/or pseudo-random drawing, in particular in order to obtain (or approximate) the number $n_{em/EPD}$ of emission points. For example, the maximum number $n_{em/EPD}$ of emission points per emission point distribution calculated in sub-step 118 may be equal to 50. The number of waveguides may be equal to 10 and the number of electrodes may be equal to 5.

In sub-step 124, the position of the waveguides $g_p$ and the position of the electrodes $e_q$ among the $$\left( m_x^{ij} \times m_y^{ij} \right)$$

waveguides $g_p$ and electrodes $e_q$ of the elementary emission zone $Z^{ij}$ may be determined by random and/or pseudo-random drawing.

The sub-steps 122 and 124 may be applied sequentially for each emission point distribution $$EPD_{uv}^{ij},$$

for example. Pseudo-random drawing carried out for a distribution $$EPD_{uv}^{ij}$$

may take into account the previous results of sub-steps 122 and 124 of one or more other emission point distributions of one and the same elementary emission zone $Z^{ij}$, such that a pair of a waveguide $g_p$ and an electrode $e_q$ representing a specific emission point $$EP_{pq}^{ij}$$

is able to be associated only with a single emission point distribution $$EPD_{uv}^{ij}.$$

The phase of physically manufacturing the device 10 takes into account the results from the design phase implemented beforehand. The physical manufacturing phase may comprise steps of manufacturing waveguides, diffraction gratings and electrodes using conventional techniques, such as for example, and without limitation, chemical or physical deposition techniques. The physical manufacturing phase may also comprise layering steps.

In addition, the physical manufacturing phase may comprise a step of recording holograms $h_{pq}$, each hologram being associated with an emission point $EP_{pq}$.

In particular, the step of recording the holograms $h_{pq}$ may take into account the results from step 180 of determining, for each emission point distribution $$EPD_{uv}^{ij},$$

the direction of the wave vector $$\vec{k}_{uv}^{ij}$$

of the resultant light wave emitted by the emission points $$EP_{pq}^{ij}$$

of the emission point distribution $$EPD_{uv}^{ij}.$$

Recording holograms is based on the interference of two groups of light beams on the holographic film. The generated interference fringes are physically or chemically stored on the holographic film, resulting in a variation in the refractive index. The two groups of beams are conventionally referred to as 'reference beams' and 'object beams'. To encode holograms $h_{pq}$ of an emission point distribution $EPD_{uv}$ (or $$EPD_{uv}^{ij}),$$

the reference beams correspond to the light waves extracted from the diffraction gratings $r_{pq}$ optically coupled to the waveguides $g_p$ and to the electrodes $e_p$ selected to form the emission points $EP_{pq}$ (or $$EP_{pq}^{ij})$$

of the distribution $EPD_{uv}$ (or $$EPD_{uv}^{ij}).$$

The hologram recording step requires an optical recording system consisting in forming object beams having an encoding angle $\beta$ with the emission surface S (or specifically the elementary emission zone $Z^{ij}$). The encoding angle $\beta$ then induces the direction of the wave vector $\vec{k}_{uv}$ (or $$\vec{k}_{uv}^{ij}).$$

The object beams, coming from a coherent light source that is not shown in the figures, are obtained from the projection of a given mask through a converging lens ($L_a$ or $L_b$), as shown in FIG. 12a and FIG. 12b. Advantageously, for each emission point distribution $EPD_{uv}$ (or $$EPD_{uv}^{ij}),$$

various zones of the emission surface S (or specifically the elementary emission zone $Z^{ij}$) are exposed sequentially to various object beams of a specific encoding angle $\beta$, so as to form emission points associated with distinct emission directions.

The discretization of the emission surface S according to the embodiments of the invention makes it possible notably to facilitate and speed up the step of recording the holograms during the phase of physically manufacturing the device 10 compared to a non-discretized surface S. Indeed, since the emission points $$EP_{pq}^{ij}$$

of one and the same emission point distribution $$EPD_{uv}^{ij}$$

are contained within a single elementary emission zone $Z^{ij}$ of size smaller than the overall size of the emission surface S, recording (or encoding) the direction of the wave vector $$\vec{k}_{uv}^{ij}$$

in the holograms associated with the emission points $$EP_{pq}^{ij}$$

makes it possible to encode angles on larger values. As shown by the optical hologram recording systems in FIG. 12a and FIG. 12b, the encoding of a zone ($Z^{ij}$ in FIG. 12b) smaller than a surface (S in FIG. 12a) induces an increase in the cone of the encoding angle $\Delta\beta$. This reduction in the encoding zone also induces a reduction in the constraints on the temporal coherence of the light source generating the object beams.

FIGS. 1, 2 and 4 show sets of waveguides $g_p$ and of electrodes $e_q$ with rectilinear configurations along the axis X and the axis Y, respectively, each waveguide $g_p$ being arranged perpendicular to the electrodes $e_q$ so as to obtain emission points $EP_{pq}$ distributed regularly in a spatially periodic grid over the emission surface S.

As a variant, the set of $M_x$ waveguides $g_p$ of the image projection device 10 may be arranged in a non-rectilinear isoline configuration in the plane defined by the emission surface S, as shown in FIG. 13.

As used here, the expression "non-rectilinear isolines" refers to a set of at least two geometric curves f1(X,Y) and f2(X,Y), defined in a plane (X,Y), such that the distance between a point p1 belonging to the geometric curve f1(X, Y) and the geometric curve f2(X,Y) is the same regardless of the point p1, said distance being defined by the length of the shortest path between the point p1 and a point of the geometric curve f2(XY) according to a reference metric $d_{ref}$. Conversely, the distance between a point p2 belonging to the geometric curve f2(X,Y) and the geometric curve f1(X,Y) is the same regardless of the point p2, said distance being defined by the length of the shortest path between the point p2 and a point of the geometric curve f1(XY) according to the reference metric $d_{ref}$. Non-rectilinear isolines thus correspond to a set of geometric curves, such that the curves of the set are always separated in pairs by a constant distance. Such geometric curves may be parametric curves defined in the plane of the emission surface S. For a given geometric curve, an associated isoline may assume a geometric curve shape that is highly variable as a function of the value of the metric $d_{ref}$ under consideration.

Advantageously, the configuration of the electrodes on the emission surface S may be similar to the configuration of the waveguides. Thus, as shown in FIG. 13, the set of $M_y$ electrodes $e_q$ of the image projection device 10 may be arranged in a non-rectilinear isoline configuration in the plane (X,Y) defined by the emission surface S.

If the isoline waveguide configuration in the plane (X,Y) is defined according to a constant reference metric value $d_{ref_y}$ between each of the waveguides $g_p$, the configuration may be a configuration of what are referred to as regular isoline waveguides. In the same way, if the isoline electrode configuration in the plane (X,Y) is defined according to a constant reference metric value $d_{ref_x}$ between each of the electrodes $e_q$, the configuration may be a configuration of what are referred to as regular isoline electrodes.

The reference metric values $d_{ref_y}$ and $d_{ref_x}$ may be variable between various waveguides $g_p$ and various electrodes $e_q$, respectively. The variabilities of the reference metric values make it possible notably to improve the suppression of diffraction effects related to possible periodicities generated in the waveguide and electrode configurations.

Advantageously, the isoline waveguide configuration and/or the isoline electrode configuration may be implemented using a fast-marching method (FMM) or level-set method (LSM).

It should be noted that the FMM and LSM methods (James Sethian, *Level Set Methods and Fast Marching Methods Evolving Interfaces in Computational Geometry, Fluid Mechanics, Computer Vision and Materials Science,* Cambridge University Press, 1999) are numerical algorithms for solving problems at the limits of the Eikonal equation so as to follow the evolution of interfaces.

FIG. 14 is a flowchart showing steps of the design phase of the method for manufacturing the device 10 that are implemented in order to generate configurations of the set of waveguides $g_p$ and/or the set of electrodes $e_q$ on the emission surface S, according to some embodiments of the invention.

In step 210, a calculation matrix is initialized. The calculation matrix corresponds to the emission surface S, the size $D_{emx}$ and $D_{emy}$, and is characterized according to predetermined calculation steps $d_{cal_x}$ and $d_{cal_y}$. The initialized calculation matrix may then be a matrix comprising a number $nb_{cal_x} \times nb_{cal_y}$ of points defined according to the following equations (23) and (24):

$$nb_{cal_x} = \left\lfloor \frac{D_{emx}}{d_{cal_x}} \right\rfloor + 1 \tag{23}$$

$$nb_{cal_y} = \left\lfloor \frac{D_{emx}}{d_{cal_y}} \right\rfloor + 1 \tag{24}$$

The calculation steps may be defined for example as a function of the width ($g_p$) of the waveguides $g_p$ and the width ($e_x$) of the electrodes $e_q$, and/or as a function of the reference metric values $d_{ref_y}$ and $d_{ref_x}$ of the waveguides $g_p$ and the electrodes $e_q$. In particular, the calculation steps may be defined so as to minimize the time required to generate these configurations while still optimizing calculation resolution. For example and without limitation, the calculation steps $d_{cal_x}$ and $d_{cal_y}$ may be equal to one and the same quantity $d_{cal}$ between 1.5 µm to 250 nm.

In step 230, for the isoline waveguide configuration, an initial geometric waveguide curve g0(X,Y) is determined and implemented in the initialized calculation matrix, as illustrated by the exemplary implementation in FIG. 15 (that is to say step 230). In equivalent fashion, in step 230, for the isoline electrode configuration, an initial geometric electrode curve e0(X,Y) may be determined and implemented in the initialized calculation matrix.

The initial geometric waveguide and/or electrode curve f0(X,Y), also called 'initial geometric curve', has a plurality of construction characteristics. For example and without limitation, some construction characteristics may comprise:
an initial geometric curve f0(X,Y) defined by a non-rectilinear geometric function and extending on either side of the emission surface S, from an initial position (X0,Y0) to a final position (Xf,Yf) in the initialized calculation matrix, the initial position and the final position being arranged along an axis of extension X' or Y', substantially parallel to the axis X or Y; in particular, as illustrated in FIG. 15 (that is to say step 230), the initial geometric waveguide curve g0(X,Y) may be defined from an initial position (0,Y0) to a final position (nb$_{cal_x}$,Yf); in the same way, the initial geometric electrode curve e0(X,Y) may be defined from an initial position (X0,0) to a final position (Xf, nb$_{cal_y}$);

an initial geometric curve f0(X,Y) comprising only ordinary points referred to as 'regular points' for which the partial derivatives of the curve along X and Y are not simultaneously zero, that is to say in this case the initial geometric curve f0(X,Y) does not comprise any stationary point referred to as a 'singular point' for which the partial derivatives of the curve along X and Y at this point are zero, the tangent at such a point then appearing to be indeterminate; in particular, the initial geometric curve f0(X,Y) then does not comprise any point referred to as a 'double point' for which the curve "passes back" on itself (or intersects) in the plane (X,Y), or any point referred to as a 'cusp' for which the curve "reverses path" in the plane (X,Y);

an initial geometric curve f0(X,Y) comprising, at any point in the plane (X,Y), a radius of curvature greater than or equal to a predefined minimum radius of curvature rc. In particular, a minimum radius of curvature rc$_p$ associated with the waveguides g$_p$ may be defined as a function of the physical properties of the waveguides g$_p$ and/or their respective manufacturing constraints. For example and without limitation, the minimum radius of curvature rc$_p$ associated with the waveguides g$_p$ may be equal to 20 µm;

an initial geometric curve f0(X,Y) contained within a predetermined zone of the initialized calculation matrix; for example and without limitation, a zone referred to as a "content zone" may be determined as a function of a number of points nb$_{max_x}$ or nb$_{max_y}$ defined with respect to the initial position (X0,Y0) and/or the final position (Xf,Yf) of the curve.

Advantageously, the initial geometric curve f0(X,Y) may be defined randomly while complying with one or more of the above construction characteristics.

The initial geometric curve f0(X,Y) may for example consist of a succession of segments. In particular, the initial geometric curve f0(X,Y) may comprise segments inclined at an angle of inclination β(X,Y) with respect to the axis of extension X' or Y' substantially parallel to the axis X or Y. The angle of inclination β(X,Y) may correspond to a constant quantity β or to a variable function in the plane (X,Y), for example a function that is increasing, decreasing or any other function, and defined randomly, pseudo-randomly and/or as a function of the construction characteristics. Along the axis of extension X' or Y', the angle of inclination β(X,Y) may be positive or negative. For example, the angle of inclination may be constant β, and alternatively positive and negative. The size of each inclined segment may be determined randomly, pseudo-randomly and/or as a function of the construction characteristics. The segments of the initial geometric curve f0(X,Y) may then be connected to one another by curved segments with a radius of curvature greater than or equal to the minimum radius of curvature.

The initial positions (0, Y0) and (X0,0), and/or similarly the "content zone" of the initial geometric curve, may be defined randomly, pseudo-randomly and/or defined for example so as to be centred in the calculation matrix initialized along the axis Y and the axis X, respectively.

In step 250, a distance function may be applied to the initial geometric curve f0(X,Y) so as to generate the isoline waveguide configuration and/or the isoline electrode configuration. Such a distance function corresponds to a succession of steps for applying one or more reference metric values d$_{ref}$ between various curves forming a non-rectilinear isoline configuration based on the initial geometric curve f0(X,Y). For example and without limitation, one distance function used in step 250 may be the fast-marching method.

By way of illustration, in step 250 for the isoline waveguide configuration, a distance map may be calculated using the fast-marching (or level-set) method applied to the initial geometric curve f0(X,Y) in the calculation matrix. For each of the nb$_{cal_x}$×nb$_{cal_y}$ points of the calculation matrix, the arbitrary isotropic distance metric is then calculated with respect to the point closest to the initial geometric curve f0(X,Y) implemented in the calculation matrix.

FIG. 15 (that is to say step 250) illustrates the result of calculating a distance map for each point of the matrix with respect to an initial geometric waveguide curve g0(X,Y) determined in the previous step 230.

In step 270, the value of a minimum distance d$_{min}$ may be determined.

In particular, in the case of determining the isoline waveguide configuration, the minimum distance d$_{min}$ corresponds to the constant and fixed spacing distance d$_{min-p}$ between two waveguides g$_p$ on the emission surface S. The value of d$_{min-p}$ may be defined with respect to the width (g$_p$) of the waveguides g$_p$, for example according to the following expression (25):

$$d_{min-p} = 3 \times g_y \qquad (25)$$

In the case of determining the isoline electrode configuration, the minimum distance d$_{min}$ corresponds to the constant and fixed spacing distance d$_{min-q}$ between electrodes e$_q$ on the emission surface S. The value of d$_{min-q}$ may be defined with respect to the width (e$_x$) of the electrodes e$_q$, for example according to the following expression (26):

$$d_{min-q} = 1, 2 \times e_x \qquad (26)$$

In step 270 as well, one or more multiples c of the value of the minimum distance d$_{min}$ may be determined. The determination of these multiples may depend notably on the size D$_{emx}$ and D$_{emy}$ of the emission surface S, and on the initial position (X0, Y0) of the initial geometric curve f0(X,Y).

For example and without limitation, if the initial position (0, Y0) is fixed so as to be centred in the calculation matrix initialized respectively along the axis Y, the multiples c×d$_{min}$ may be determined for the interval indices c defined according to the following expression (27):

$$c = \left[1; \left|\frac{D_{emy}}{2 \times d_{min-q}}\right|\right] \qquad (27)$$

In step 290, the set of isolines (also called isoline paths) of a configuration may be determined based on the distance map and as a function of the multiples c of the minimum distance value $d_{min}$. In particular, for each order c, an isoline associated with the initial geometric curve f0(X,Y) that is implemented corresponds to the position of the points of the calculation matrix associated with the closest distance value $c \times d_{min}$. Thus, in step 290, the waveguide configuration and/or said electrode configuration are determined.

FIG. 15 (that is to say step 290) illustrates the result of a set of isolines associated with the initial geometric waveguide curve g0(X,Y) corresponding to the isoline of order c=0. The determined set of isolines may thus be obtained for isolines defined based on the orders c=[−7; −1] and c=[1; 7]. In this example, each waveguide $g_p$ of order p then corresponds to an isoline of order c.

The steps of generating the configurations of the set of waveguides $g_p$ and of the set of electrodes $e_q$ on the emission surface S in the design phase of the method for manufacturing the image projection device 10 make it possible in particular to minimize degradations of the projected image related to spatial periodicities between the emission points $EP_{pq}$ and to optimize the number of emission points $EP_{pq}$ on the emission surface S so as to maximize the resolution of the image formed on the retina R, so as for example to obtain an optimized contrast.

In particular, implementing fast-marching (or level-set) methods to calculate the distance maps in step 250 makes it possible to promote an aperiodic distribution of the intersections between the waveguides $g_p$ and the electrodes $e_q$, and therefore the aperiodic distribution of the various emission points $EP_{pq}$, thereby leading to an improvement in image quality.

FIG. 16a shows the result of a simulation of the spatial distribution of the intensity of the percussive response (that is to say PSF) on the retina R formed by illumination points associated with emission point distributions on the emission surface S defined based on waveguide and electrode configurations obtained by translating a curve segmented along the axis Y and the axis X, respectively. These configurations are called configurations based on "segment translations" hereinafter. Although such configurations improve the aperiodicity of the distribution of the various emission points $EP_{pq}$ compared to rectilinear configurations, such configurations do not make it possible to avoid diffraction effects during the formation of the image on the retina R since, as illustrated in the simulation in FIG. 16a, the intensity of the percussive response exhibits lines in the noise generated by the alignment of certain emission points $EP_{pq}$.

Conversely, FIG. 16b shows the result of a simulation of the spatial distribution of the intensity of the percussive response (that is to say PSF) on the retina R formed by illumination points associated with emission point distributions on the emission surface S defined based on isoline waveguide and electrode configurations. As illustrated in FIG. 16b, such configurations make it possible to limit diffraction effects during the formation of the image on the retina R, and thus to obtain more uniform noise.

Moreover, calculating the number of intersections between the waveguides $g_p$ and the electrodes $e_q$, and therefore of emission points $EP_{pq}$, for an emission surface S associated with isoline waveguide and electrode configurations, increases (notably by more than 14%) compared to an emission surface S associated with waveguide and electrode configurations based on "segment translations", each emission surface S in this case comprising the same numbers $M_x$ of waveguides $g_p$ and $M_y$ of electrodes $e_q$. This significant increase in emission points $EP_{pq}$ induces an increase in density and therefore an increase in the possible number of pixels of the image to be projected and/or an increase in the intensity of the illuminated points on the retina R, while at the same time improving the aperiodic distribution of the various emission points $EP_{pq}$.

FIGS. 17a and 17b show the results of the comparison of criteria for quantifying the quality of the image that are generated from two distinct emission surfaces S each associated with random drawing from a number of 25000 emission points $EP_{pq}$. The first emission surface S is associated with waveguide and electrode configurations based on "segment translations", and the second emission surface S is associated with isoline waveguide and electrode configurations.

In particular, FIG. 17a shows the results of the comparison of the power ratios $\gamma$ for each of the distinct emission surfaces S. As illustrated, implementing isolines makes it possible to reduce the power ratio $\gamma$ compared to configurations based on "segment translations", this meaning that this induces a reduction in the power of the intensity noise formed by the emission point distribution compared to the power of the central intensity peak, and thus an improvement in the quality of the projected image.

FIG. 17b shows the results of the comparison of the signal-to-noise ratios (SNR) for each of the distinct emission surfaces S. It should be noted that the SNR criterion, like the power ratio $\gamma$, makes it possible to quantify the efficiency of the self-focusing of an emission point distribution $EPD_{uv}$ at a point $R_{uv}$ on the retina R of the eye. As illustrated in FIG. 8a, the SNR criterion may be evaluated based on the difference between the height of the central intensity peak formed by the emission point distribution and the height of the peak referred to as 'secondary peak'. As shown in FIG. 17b, implementing isolines makes it possible to increase the signal-to-noise ratio compared to configurations based on "segment translations", this also meaning an improvement in the quality of the projected image.

According to some embodiments, the emission surface S may be discretized into ($L_x \times L_y$) elementary emission zones $Z^{ij}$ in the plane (X,Y), as illustrated by FIG. 18. Each elementary emission zone $Z^{ij}$ may be associated with a number $$m_x^{ij}$$

of waveguides $$g_p^{ij}$$

and with a number $$m_y^{ij}$$

of electrodes $$e_q^{ij},$$

so as to generate a subset of $$\left(m_x^{ij} \times m_y^{ij}\right)$$

emission points $$EP_{pq}^{ij}$$

defined among the ($M_x \times M_y$) emission points $EP_{pq}$ of the emission surface S. Each elementary emission zone $Z^{ij}$ may then be associated with a finite number of emission point distributions $$EPD_{uv}^{ij}.$$

Each emission point distribution $$EPD_{uv}^{ij}$$

of an elementary emission zone $Z^{ij}$ then consists of one or more emission points $$EP_{pq}^{ij}$$

determined solely among the $$\left(m_x^{ij} \times m_y^{ij}\right)$$

emission points $$EP_{pq}^{ij}$$

of the elementary emission zone $Z^{ij}$. For each elementary emission zone $Z^{ij}$, the subset of $$m_x^{ij}$$

waveguides $$g_p^{ij}$$

may be arranged in a non-rectilinear isoline waveguide sub-configuration, and the subset of $$m_y^{ij}$$

electrodes $$e_q^{ij}$$

may be arranged in a non-rectilinear isoline electrode sub-configuration.

Advantageously, for each elementary emission zone $Z^{ij}$, the isoline waveguide sub-configuration and/or the isoline electrode sub-configuration may be generated based on the application of the fast-marching (or level-set) method as described notably by the steps of the design phase for generating the configurations.

For example and without limitation, for an elementary emission zone $Z^{ij}$, a non-rectilinear isoline sub-configuration may be formed from an initial geometric curve extending in the plane of the emission surface S on either side of the elementary emission zone $Z^{ij}$, from an intermediate initial position to an intermediate final position that are arranged along an axis of extension X' or Y' substantially parallel to the axis X or to the axis Y.

In the embodiments described above, each emission point $EP_{pq}$ is formed from a hologram $h_{pq}$ inscribed in a holographic film H and illuminated by light extracted from a light guide $g_p$. In these cases, each hologram $h_{pq}$ makes it possible to control the phase and to control the angle of the light wave extracted at the diffraction grating $r_{pq}$. Other alternatives for forming (or configuring) the set of orientation elements and therefore the emission points may be envisaged.

In particular, the fourth layer (that is to say the holographic film H) may be replaced by a spatial light modulator (SLM) arranged facing the diffraction grating. An SLM located at an emission point may be formed by liquid crystals, for example. The SLM may then be configured (that is to say manufactured) to control the phase of the light wave extracted at the diffraction grating $r_{pq}$. In this case, each diffraction grating $r_{pq}$ may be configured (that is to say manufactured) to control the angle of the light wave in addition to extracting the light wave. As a variant, the fourth layer may additionally comprise a hologram holographic film $h_{pq}$ configured (that is to say manufactured) to control only the angle of the light wave.

It should be noted that some features of the invention may have advantages when considered separately.

Those skilled in the art will readily understand that some method steps and sub-steps described above may be carried out simultaneously and/or in a different order, for example in an order defined based on the characteristics of the image projection device 10.

The device and the methods described above according to the embodiments of the invention or sub-elements of this system may be implemented in various ways using hardware, software or a combination of hardware and software, notably in the form of program code able to be distributed in the form of a program product, in various forms.

The invention is not limited to the embodiments described above by way of non-limiting example. It encompasses all variant embodiments that might be envisaged by those skilled in the art. In particular, those skilled in the art will understand that the invention is not limited to the various elementary emission zones and to the various isoline configurations of the image projection device described by way of non-limiting example. In particular, some embodiments of the invention may be combined.

The invention claimed is:

1. A method for manufacturing an image projection device for projecting an image onto an eye, the device being defined in an orthogonal reference system (X,Y,Z) and comprising an emission surface S extending generally in the plane (X,Y) of said orthogonal reference system (X,Y,Z), the emission surface S comprising a stack of elements, said elements comprising a set of $M_x$ waveguides $g_p$, a set of $M_x \times M_y$ diffraction gratings $r_{pq}$ and a set of $M_y$ electrodes $e_q$, $M_x$ and $M_y$ being positive integers whose product $M_x \times M_y$ is strictly greater than 1, each diffraction grating $r_{qp}$ being positioned at the intersection of one of said waveguides $g_p$ and one of said electrodes $e_p$ so as to form an emission point $EP_{pq}$ for a light wave, said set of $M_x$ waveguides $g_p$ being arranged in a waveguide configuration, and said set of $M_y$ electrodes $e_q$ being arranged in an electrode configuration, the method comprising a phase of designing said device and a phase of physically manufacturing said device thus designed, wherein said design phase comprises a step consisting in determining said waveguide configuration or said electrode configuration, said determined configuration being a non-rectilinear isoline configuration defined in the plane (X,Y) defined by the emission surface S and generating an aperiodic distribution of the $M_x \times M_y$ emission points $EP_{pq}$.

2. The method for manufacturing an image projection device according to claim 1, wherein the step of determining a configuration consists in determining said waveguide configuration and said electrode configuration, said determined configurations being non-rectilinear isoline configurations defined in the plane (X,Y) defined by the emission surface S and generating an aperiodic distribution of the $M_x \times M_y$ emission points $EP_{pq}$.

3. The method for manufacturing an image projection device according to claim 1, wherein said design phase comprises the step consisting in determining an initial geometric curve extending on either side of said emission surface S along an axis of extension parallel to the axis X and/or to the axis Y of said orthogonal reference system (X,Y,Z), said initial geometric curve being defined randomly while complying with at least one curve construction characteristic.

4. The method for manufacturing an image projection device according to claim 3, wherein said initial geometric curve consists of a succession of segments.

5. The method for manufacturing an image projection device according to claim 3, wherein said design phase comprises the step consisting in applying a distance function to said initial geometric curve so as to generate the isoline waveguide configuration and/or the isoline electrode configuration.

6. The method for manufacturing an image projection device according to claim 5, wherein said distance function is determined by a fast-marching method.

7. The method for manufacturing an image projection device according to claim 3, wherein said initial geometric curve comprises only ordinary points referred to as 'regular points' for which the partial derivatives of said curve along X and Y are not simultaneously zero.

8. The method for manufacturing an image projection device according to claim 3, wherein said initial geometric curve comprises, at any point of said curve, in the plane (X,Y), a radius of curvature greater than or equal to a predefined minimum radius of curvature.

9. The method for manufacturing an image projection device according to claim 8, wherein said minimum radius of curvature is defined on the basis of the physical properties of the waveguides $g_p$ and/or of the electrodes $e_q$, and/or of the manufacturing constraints of said waveguides or of said electrodes.

10. The method for manufacturing an image projection device according to claim 1, wherein said design phase comprises the step consisting in discretizing said emission surface S into $L_x \times L_y$ elementary emission zones $Z^{ij}$ in a continuous mesh in the plane (X,Y), each elementary emission zone $Z^{ij}$ comprising a subset of $$m_x^{ij} \times m_y^{ij}$$

emission points $$EP_{pq}^{ij},$$

said step consisting in determining said waveguide configuration and/or said electrode configuration being applied to each elementary emission zone $Z^{ij}$ so as to form a non-rectilinear isoline waveguide sub-configuration and/or a non-rectilinear isoline electrode sub-configuration.

11. The method for manufacturing an image projection device according to claim 10, wherein said non-rectilinear isoline waveguide sub-configuration and/or said non-rectilinear isoline electrode sub-configuration are generated by applying a fast-marching method to an initial geometric curve extending in the plane of the emission surface S on either side of the elementary emission zone $Z^{ij}$ along an axis of extension parallel to the axis X and/or to the axis Y.

12. An image projection device for projecting an image onto an eye, the device being manufactured based on the method defined according to claim 1, said device being defined in an orthogonal reference system (X,Y,Z) and comprising an emission surface S extending generally in the plane (X,Y) of said orthogonal reference system (X,Y,Z), the emission surface S comprising a stack of elements, said elements comprising a set of $M_x$ waveguides $g_p$, a set of $M_x \times M_y$ diffraction gratings $r_{pq}$ and a set of $M_y$ electrodes $e_q$, the numbers $M_x$ and $M_y$ being integers strictly greater than 1, each diffraction grating $r_{qp}$ being positioned at the intersection of one of said waveguides $g_p$ and one of said electrodes $e_p$ so as to form an emission point $EP_{pq}$ for a light wave, said set of $M_x$ waveguides $g_p$ being arranged in a waveguide configuration, and said set of $M_y$ electrodes $e_q$ being arranged in an electrode configuration, said waveguide configuration or said electrode configuration being a non-rectilinear isoline configuration defined in the plane (X,Y) defined by the emission surface S and generating an aperiodic distribution of the $(M_x \times M_y)$ emission points $EP_{pq}$.

13. A transparent portable optical data display system comprising an image projection device according to claim 12, wherein said system is a glasses system or an augmented reality headset.

\*    \*    \*    \*    \*